United States Patent
Noguchi et al.

(10) Patent No.: US 12,257,998 B2
(45) Date of Patent: Mar. 25, 2025

(54) BODY-SIZE CLASS SPECIFICATION DEVICE, BODY-SIZE CLASS SPECIFICATION METHOD, DRIVING-POSITION SETTING DEVICE, AND DRIVING-POSITION SETTING METHOD

(71) Applicant: MAZDA MOTOR CORPORATION, Hiroshima (JP)

(72) Inventors: Kosuke Noguchi, Aki-gun (JP); Yoshito Hirata, Aki-gun (JP); Hiroki Uemura, Aki-gun (JP); Tomonori Ohtsubo, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 362 days.

(21) Appl. No.: 17/831,324

(22) Filed: Jun. 2, 2022

(65) Prior Publication Data
US 2022/0388429 A1 Dec. 8, 2022

(30) Foreign Application Priority Data
Jun. 2, 2021 (JP) .................................. 2021-093107

(51) Int. Cl.
*B60N 2/02* (2006.01)
*B60W 40/08* (2012.01)
*B62D 1/18* (2006.01)

(52) U.S. Cl.
CPC ............ *B60W 40/08* (2013.01); *B60N 2/0273* (2023.08); *B62D 1/18* (2013.01); *B60N 2/0268* (2023.08); *B60W 2540/221* (2020.02)

(58) Field of Classification Search
CPC .... B60N 2/0244; B60N 2/002; B60N 2/0268; B60W 40/08; B60W 2540/221; B62D 1/18; B60R 16/037
See application file for complete search history.

(56) References Cited

U.S. PATENT DOCUMENTS

| | | | |
|---|---|---|---|
| 10,850,693 B1 * | 12/2020 | Pertsel ................. | G06V 40/103 |
| 2018/0178678 A1 | 6/2018 | Ishikawa | |
| 2020/0282867 A1 | 9/2020 | Yi et al. | |

FOREIGN PATENT DOCUMENTS

| | | |
|---|---|---|
| JP | 2006-015872 A | 1/2006 |
| JP | 2014-201174 A | 10/2014 |

* cited by examiner

*Primary Examiner* — Yuen Wong
(74) *Attorney, Agent, or Firm* — Studebaker Brackett PLLC

(57) ABSTRACT

A body-size class specification device of the present invention comprises a class feature-quantity information memorizing section to memorize class feature-quantity information to correlate plural classes for classifying a body size according to a dimension ratio of prescribed parts of a body with plural prescribed feature quantities for characterizing the plural classes, a first input section as an example of a feature-quantity acquiring section to acquire feature quantity of an object person to be specified for the class, an eye-height measuring section and an upper-body-length-ratio processing section, and a class specifying section to specify the class corresponding to the feature quantity of the object person acquired by the feature-quantity acquiring section based on the class feature-quantity information memorized by the class feature-quantity information memorizing section.

3 Claims, 9 Drawing Sheets

BODY-SIZE CLASS SPECIFICATION DEVICE, BODY-SIZE CLASS SPECIFICATION METHOD, DRIVING-POSITION SETTING DEVICE, AND DRIVING-POSITION SETTING METHOD

BACKGROUND OF THE INVENTION

The present invention relates to a body-size class specification device and a body-size class specification method, in which a body-size class of an object person is specified (selected) from plural classes (body-size classes, body-size groups) for classifying a body size according to a dimension ratio of prescribed parts of a body, and a driving-position setting device and a driving-position setting method, in which the body-size class specification device and the body-size class specification method are provided and at least a position of a seat of a vehicle is controlled such that an appropriate driving position is attained.

The appropriate driving position of a passenger is generally necessary in order to drive the vehicle safely and comfortably. This driving position can be set (adjusted) by partially or as a whole adjusting an inclination of a seatback, a position of a seat cushion in a longitudinal direction, a position (height) of the seat cushion in a vertical direction and an inclination of a seat surface of the seat cushion, and a vertical position and a longitudinal position of a steering wheel. The passenger adjusts part or all of the above-described matters according to the passenger's body size when driving the vehicle. In these days, some technologies to adjust the driving position automatically have been researched and developed as disclosed in Japanese Patent Laid-Open Publication No. 2014-201174, for example.

A vehicle control system disclosed in the above-described patent document comprises a camera which is fixed to a certain position in a vehicle cabin such that an optical axis is inclined by a specified fixation angle to a prescribed standard direction, a body information calculating means for calculating body information relating to sitting height of a driver by using at least eye's height of the driver in an image captured by the camera and an reclining angle and a slide quantity of a driver's seat in the standard direction when the camera captures the image, a seat recommendation-value acquiring means for acquiring recommendation values of the reclining angle and the slide quantity according to the body information calculated by the body information calculating means, and a seat controlling means for controlling the seat such that the actual reclining angle and slide quantity of the seat match the recommendation values acquired by the seat recommendation-value acquiring means.

Herein, the vehicle control system of the above-described patent document may not cause any problem in a case where this system is installed to a vehicle which is sold and consumed in its manufacturing country. However, the vehicle is generally exported to various regions or countries, and the body sizes of passengers differ in destinations. For example, leg's length of the white race is relatively long and upper-body's length (sitting height) of the yellow race is relatively long. Therefore, there is concern that the vehicle control system of the above-described patent document may not necessarily acquire the recommendation values of the reclining angle and the slide quantity according to the body size of the passengers in the destinations, so that the appropriate driving position may not be attained.

SUMMARY OF THE INVENTION

The present invention has been devised in view of the above-described matter, and an object of the present invention is to provide a body-size class specification device and a body-size class specification method which can automatically specify a class (body-size class) of an object person from plural classes, and a driving-position setting device and a driving-position setting method which are provided with the above-described body-size class specification device and the above-described body-size class specification method and can control the position of the vehicle seat such that the appropriate driving position according to the body size of the passenger in the destination is attained.

A first aspect of the present invention is a body-size class specification device, comprising a class feature-quantity information memorizing section to memorize class feature-quantity information to correlate plural classes for classifying a body size according to a dimension ratio of prescribed parts of a body with plural prescribed feature quantities for characterizing the plural classes, a feature-quantity acquiring section to acquire feature quantity of an object person to be specified for the class, and a class specifying section to specify the class corresponding to the feature quantity of the object person acquired by the feature-quantity acquiring section based on the class feature-quantity information memorized by the class feature-quantity information memorizing section.

Preferably, the plural classes in the above-described body-size class specification device are the ones to classify the races or the ones to classify the sexualities as well as the races. Further, the plural classes in the above-described body-size class specification device are preferably the ones to classify regions or the ones to classify the sexualities as well as the regions. Moreover, the plural classes in the above-described body-size class specification device are preferably the ones to classify nations (counties) or the ones to classify the sexualities as well as the nations (countries).

The above-described body-size specification device can automatically specify the class of the object person from the plural classes based on the feature quantity of the object person to be specified for the class by using the class feature-quantity information which is memorized by correlating the plural classes for classifying the body size with the plural prescribed feature quantities for characterizing the plural classes.

In an embodiment of the above-described body-size specification device according to the present invention, the feature quantity of the object person incudes standing height of the object person and an upper-body-length ratio of upper body's length of the object person to leg's length of the object person. Herein, the standing height means the length from a sole to a top of head of the person in a standing state, the leg's length means the length from the sole to a hip point of the person in the standing state, and the upper-body's length (sitting height) means the length from the hip point to the top of head of the person in the standing state.

A body includes various parts, such as a head portion, an arm portion, a hand portion, a neck portion, a trunk portion, a leg portion, and a foot portion. Further, the arm portion comprises an upper arm portion, a front arm portion, and etc., and the leg portion comprises a thigh portion, a shin portion and etc. Meanwhile, the body size of the person may be classified from aspects of the races (e.g., the yellow race, the black people, and white race), the regions (e.g., the Asian region, Europe, North America), the nations (countries), or the like based on various parameters, such as genetic information, climate and natural features, or lifestyle habits. Further, the body size generally differs in sexuality and therefor the body size may be classified based on the sexuality. For each body size of the above-described classified persons, a dimension ratio of prescribed parts of a body can be determined statistically. In a case where the body size is classified into the plural classes according to the dimension ratio of the prescribed parts of the body, the feature quantity for characterizing the classes has been studied and researched. The inventors of the present invention have repeatedly conducted researches in a try-and-error manner by determining whether or not the class can be characterized with assumption of the size (largeness) of the head portion of the person as the feature quantity, or by determining whether or not the class can be characterized with assumption of the leg's length of the person as the feature quantity, for example. As a result of these researches, the inventors have found that the standing height and the upper-body-length ratio of the upper body's length to the leg's length (the upper-body-length ratio=the upper body's length/the leg's length) can be the feature quantity for characterizing the classes. The above-described body-size class specification device is the invention made through the above-described researches, which can properly specify the class of the object person based on the feature quantity of the object person.

In another embodiment of the above-described body-size specification device according to the present invention, the feature-quantity acquiring section comprises an input section to receive an input of the standing height of the object person, an eye-height measuring section to measure eye's height of the object person in a seated position, and an upper-body-length-ratio processing section to determine the upper-body's length of the object person based on the standing height received by the input section and the eye's height measured by the eye-height measuring section, determine the leg's length of the object person based on the determined upper-body's length and the standing height received by the input section, determine the upper-body-length ratio of the determined upper-body's length to the determined leg's length, and decide the feature quantity of the object person by using the standing height inputted by the input section and the determined upper-body-length ratio. Herein, in a case where the height (vertical position) of a siting surface of the seat is changeable, the above-described upper-body-length-ratio processing section of the body-size specification device preferably determines the upper-body's length of the object person based on the standing height of the object person received by the input section, the eye's height measured by the eye-height measuring section, and the height of the sitting surface of the seat where the object person is seated.

The above-described body-size specification device can automatically determine the upper-body-length ratio included in the feature quantity based on input of the standing height of the object person and measurement of the eye's height of the object person.

A second aspect of the present invention is a body-size class specification method, in which class feature-quantity information to correlate plural classes for classifying a body size according to a dimension ratio of prescribed parts of a body with plural prescribed feature quantities for characterizing the plural classes is memorized by a class feature-quantity information memorizing section and the class of an object person is specified from the plural classes, the body-size class specification method comprising a feature-quantity acquiring step of acquiring the feature quantity of the object person, and a class specifying step of specifying the class corresponding to the feature quantity of the object person acquired by the feature-quantity acquiring step based on the class feature-quantity information memorized by the class feature-quantity information memorizing section.

The above-described body-size specification method can automatically specify the class of the object person from the plural classes based on the feature quantity of the object person to be specified for the class by using the class feature-quantity information which is memorized by correlating the plural classes for classifying the body size with the plural prescribed feature quantities for characterizing the plural classes.

A third aspect of the present invention is a driving-position setting device for a passenger seated in a seat for a vehicle, which is provided with the above-described body-size class specification device, wherein the feature-quantity acquiring section includes an input section to receive an input of standing height of the passenger, the driving-position setting device comprising a class dimension-ratio information memorizing section to memorize class dimension-ratio information to correlate the plural classes with plural dimension-ratio information representing a dimension ratio of prescribed second parts of the body relating to a driving position of the passenger, a seat driving section to move a position of the seat, a dimension-ratio specifying section to specify dimension-ratio information corresponding to the class specified by the class specifying section based on the class dimension-ratio information memorized by the class dimension-ratio information memorizing section, and a position control section to control the seat driving section such that the position of the seat becomes the one corresponding to the driving position based on the standing height of the passenger received by the input section and the dimension-ratio information specified by the dimension-ratio specifying section.

According to the third aspect of the present invention, there can be provided the driving-position setting device which is capable of controlling the position of the seat such that the appropriate driving position according to the body size of the passenger in the destination is attained. Since the above-described diving position setting device is provided with the body-size class specification device, the class of the passenger can be specified without any input of the class of the passenger, so that it is unnecessary to manufacture the vehicle differently according to the destination. This can properly reduce manufacturing steps and costs. Thus, since the class of the passenger is specified, the driving-position setting device can automatically attain the appropriate driving position according to the class of the passenger.

A fourth aspect of the present invention is a driving-position setting device for a passenger seated in a seat for a vehicle, which is provided with the above-described body-size class specification device, comprising a class dimension-ratio information memorizing section to memorize class dimension-ratio information to correlate the plural classes with plural dimension-ratio information representing a dimension ratio of prescribed second parts of the body relating to a driving position of the passenger, a seat driving section to move a position of the seat, a dimension-ratio specifying section to specify dimension-ratio information corresponding to the class specified by the class specifying section based on the class dimension-ratio information memorized by the class dimension-ratio information memorizing section, and a position control section to control the seat driving section such that the position of the seat becomes the one corresponding to the driving position based on the standing height of the passenger received by the input section and the dimension-ratio information specified by the dimension-ratio specifying section, wherein the class specifying section is configured to select the standing height and the upper-body-length ratio nearest to the standing height of the passenger received by the input section and the determined upper-body-length ratio from the plural standing heights and the plural upper-body-length ratios which are correlated with the plural classes in a two-dimensional coordinates space with two axes of the standing height and the upper-body-length ratio, and to specify the class corresponding to the selected standing height and upper-body-length ratio as the one corresponding to the feature quantity of the passenger acquired by the feature-quantity acquiring section, and the position control section is configured to determine respective lengths of the second parts of the passenger based on the standing height of the passenger received by the input section and the specified dimension-ratio information, to correct the determined respective lengths of the second parts based on a difference between a first point which is represented by the standing height of the passenger received by the input section and the determined upper-body-length ratio and a second point which is represented by the nearest standing height and upper-body-length ratio in the two-dimensional coordinates space, and to control the seat driving section such that the position of the seat becomes the one corresponding to the driving position based on the corrected respective lengths of second parts. Preferably, in the above-described driving-position setting device, the above-described nearest standing height and upper-body-length ratio are the standing height of the passenger received by the input section and the upper-body-length ratio nearest to the above-described determined upper-body-length ratio. Preferably, in the above-described driving-position setting device, the above-described nearest standing height and upper-body-length ratio are the standing height and the upper-body-length ratio which are the nearest in a distance to the standing height of the passenger received by the input section and the above-described determined upper-body-length ratio. Preferably, in the above-described driving-position setting device, the above-described position control section is configured to correct only the second part correlated with the upper-body's length except the leg's length in above-described second parts (not correct the second part not correlated with the upper-body's length).

The above-described driving-position setting device corrects the respective lengths of the second parts, so that the appropriate driving position according to the passenger seated in the seat can be attained.

In an embodiment of the above-described third aspect of the present invention, the driving-position setting device further comprises a steering device capable of changing a position of a steering wheel, wherein the position control section is configured to further control the steering device such that the position of the steering wheel becomes the one corresponding to the driving position based on the standing height of the passenger received by the input section and the dimension-ratio information specified by the dimension-ratio specifying section. That is, the above-described position control section controls the above-described seat driving section and the above-described steering device such that the seat's position and the steering wheel's position become the ones corresponding to the driving position based on the standing height of the passenger received by the input section and the dimension-ratio information specified by the dimension-ratio specifying section.

Thus, the driving-position setting device controls not only the seat's position but the steering wheel's position, so that the more appropriate driving position can be attained.

A fifth aspect of the present invention is a driving-position setting method for a passenger seated in a seat for a vehicle, which is provided with the above-described body-size class specification method, wherein class dimension-ratio information to correlate the plural classes with plural dimension-ratio information representing dimension ratios of prescribed second parts of the body relating to a driving position of the passenger is memorized by a class dimension-ratio information memorizing section and a position of the seat is controlled, the driving-position setting method comprising an input step of receiving an input of standing height of the passenger, a dimension-ratio specifying step of specifying dimension-ratio information corresponding to the class specified by the class specifying section based on the class dimension-ratio information memorized by the class dimension-ratio information memorizing section, and a position control step of controlling the position of the seat such that the position of the seat becomes the one corresponding to the driving position based on the standing height of the passenger in the input step and the dimension-ratio information specified in the dimension-ratio specifying step.

According to the fifth aspect of the present invention, there can be provided the driving-position setting method provided with the above-described body-size class specification method and capable of controlling the position of the seat of the vehicle such that the appropriate driving position according to the body size of the passenger in the destination can be attained. Since the above-described driving setting method is provided with the above-described bod-size class specification method, the class of the passenger can be specified without any input of the class of the passenger, so that it is unnecessary to manufacture the vehicle differently according to the destination. This can properly reduce manufacturing steps and costs. Thus, since the class of the passenger is specified, the driving-position setting method can automatically attain the appropriate driving position according to the class of the passenger.

In an embodiment of the above-described driving-position setting method, the position control step is configured to further control a position of a steering wheel of the vehicle such that the position of the steering wheel becomes the one corresponding to the driving position based on the standing height of the passenger received in the input step and the dimension-ratio information specified in the dimension-ratio specifying step.

According to this embodiment, since the driving-position setting method controls not only the seat's position but the steering wheel's position, the more appropriate driving position can be attained.

The present invention will become apparent from the following description which refers to the accompanying drawings.

DETAILED DESCRIPTION OF THE INVENTION

Figure 1:
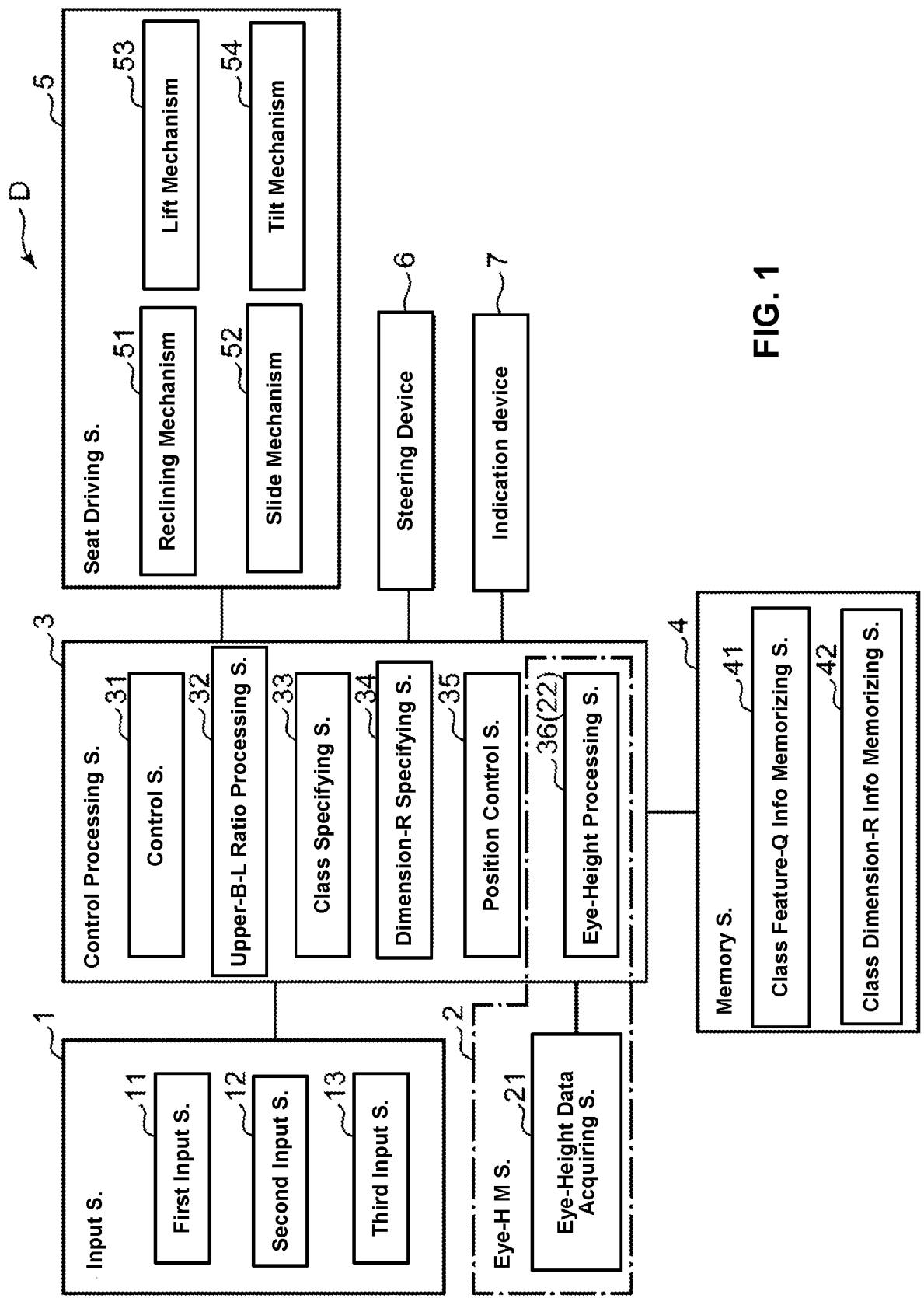
FIG. 1 is a block diagram showing constitution of a driving-position setting device which is provided with a body-size class specification device according to an embodiment.

Hereafter, one or more embodiments of the present invention will be described referring to the drawings. Claims of the invention are not limited to the described embodiments. In the drawings, the same structures are dented by the same reference characters, duplicated explanations of which will be omitted in some cases. In the present description, the reference characters without subscripts are used in a case where they will be collectively referred to, but the reference characters with subscripts are used in a case where they will be particularly referred to.

A driving-position setting device of the embodiment is the one to control a position of a seat of a vehicle (hereafter, referred to as the "vehicle seat") such that an appropriate driving position for a passenger seated in the vehicle seat is attained. The present driving-position setting device for the passenger seated in the vehicle seat comprises a body-size class specification device to specify a class (body-size class) of the passenger seated in the vehicle seat from plural classes (body-size classes) for classifying a body size according to a dimension ratio of prescribed parts (first parts, parts for body-size classification) of a body, a class dimension-ratio information memorizing section to memorize class dimension-ratio information to correlate the above-described plural classes with plural dimension-ratio information representing a dimension ratio of prescribed second parts (driving-position relating parts) of the body relating to a driving position of the passenger, a seat driving section to move a position of the vehicle seat, a dimension-ratio specifying section to specify dimension-ratio information corresponding to the class specified by the above-described class specifying section based on the class dimension-ratio information memorized by the class dimension-ratio information memorizing section, and a position control section to control the seat driving section such that the position of the vehicle seat becomes the one corresponding to the driving position based on standing height of the passenger received by an input section and the dimension-ratio information specified by the dimension-ratio specifying section. The above-described body-size class specification device comprises a class feature-quantity information memorizing section to memorize class feature-quantity information to correlate the plural classes with plural prescribed feature quantities for characterizing the plural classes, a feature-quantity acquiring section to acquire feature quantity of an object person to be specified for the class, i.e., the passenger in the above-described example, and a class specifying section to specify the class corresponding to the feature quantity of the object person (passenger) acquired by the above-described feature-quantity acquiring section based on the class feature-quantity information memorized by the above-described class feature-quantity information memorizing section. Hereafter, the driving-position setting device provided with the above-described body-size specification device will be described more specifically.

FIG. 1 is a block diagram showing constitution of the driving-position setting device provided with the body-size class specification device according to the embodiment.

Figure 2A:
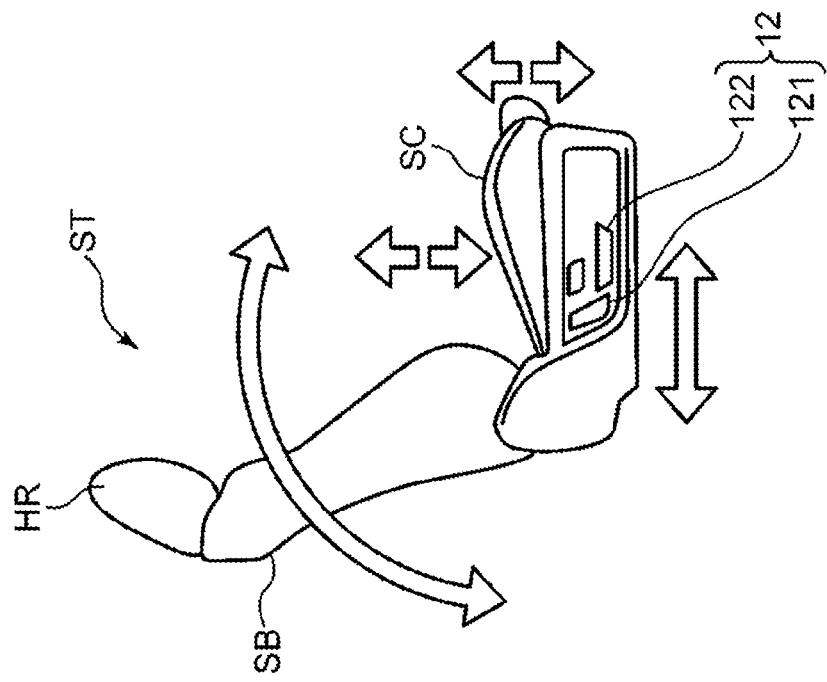
FIGS. 2A and 2B are diagrams explaining a second input section of the driving-position setting device.
Figure 2B:
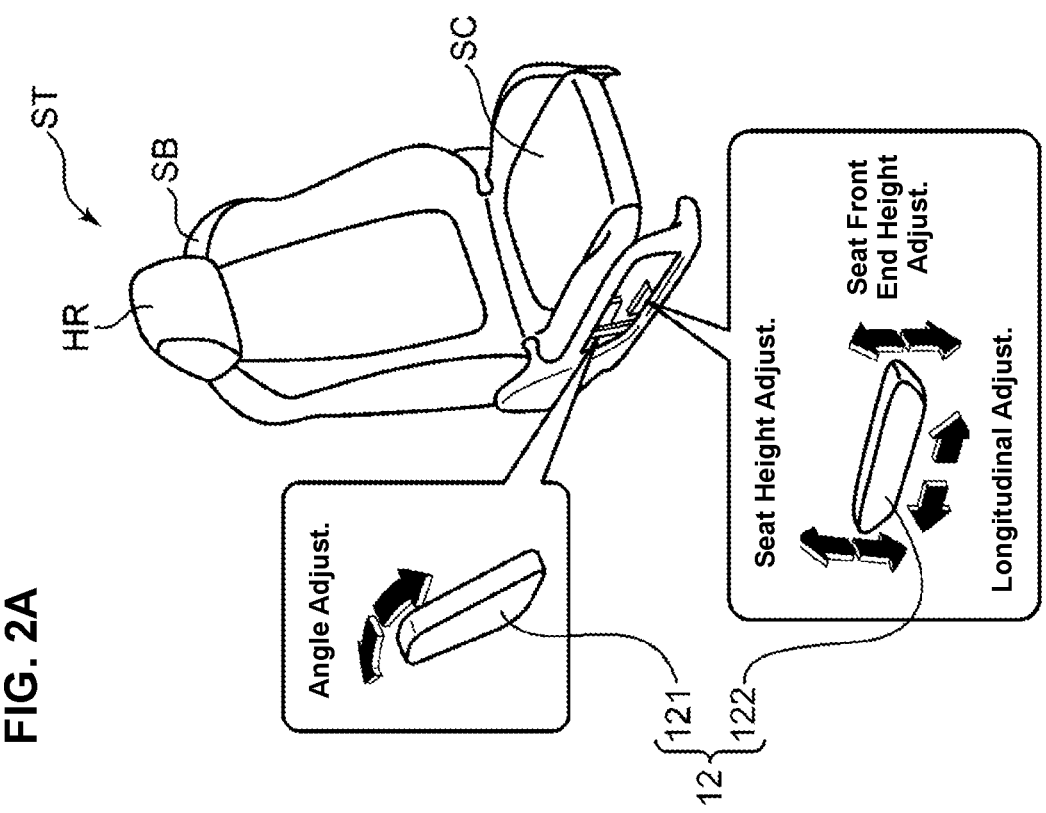
Figure 3A:
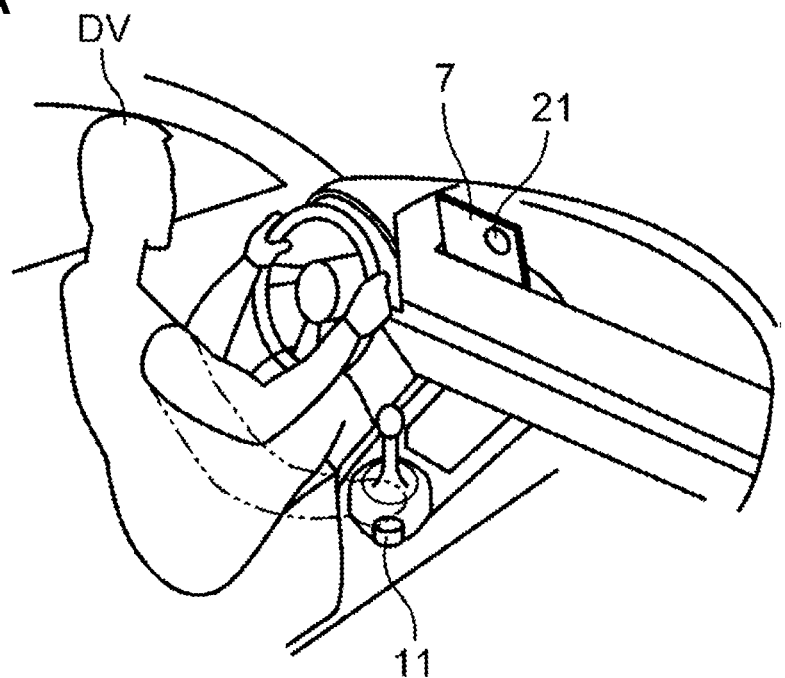
FIGS. 3A and 3B are diagrams explaining a first input section and an eye-height measuring section of the driving-position setting device.
Figure 3B:
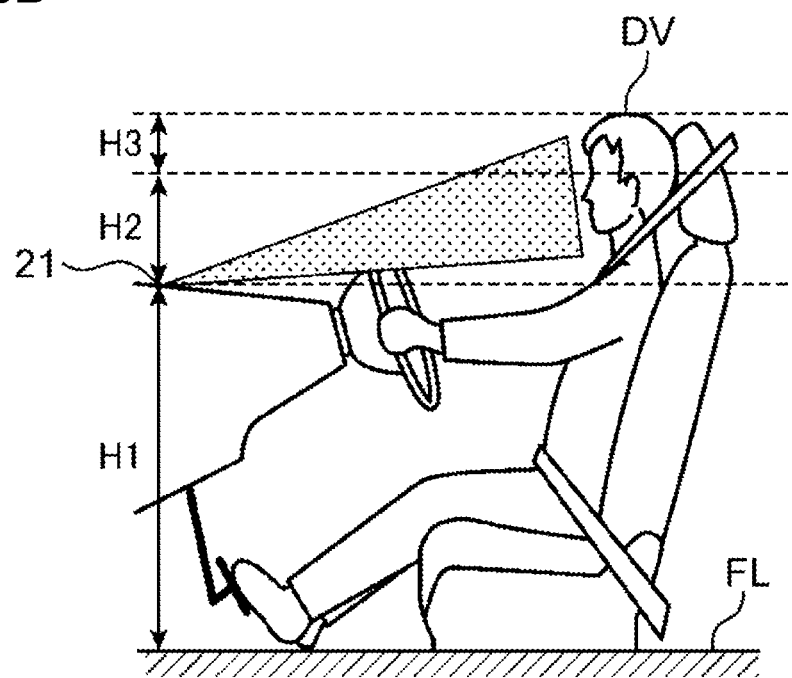
Figure 4:
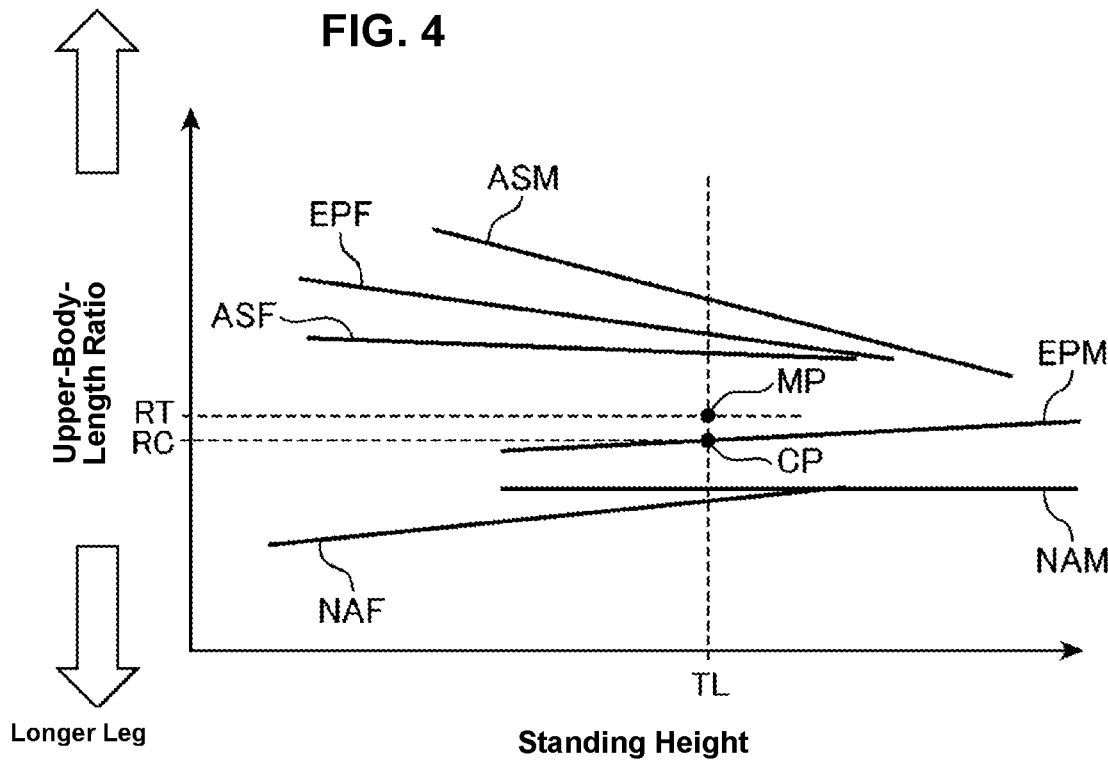
FIG. 4 is a graph explaining class feature-quantity information as an example.
Figure 5:
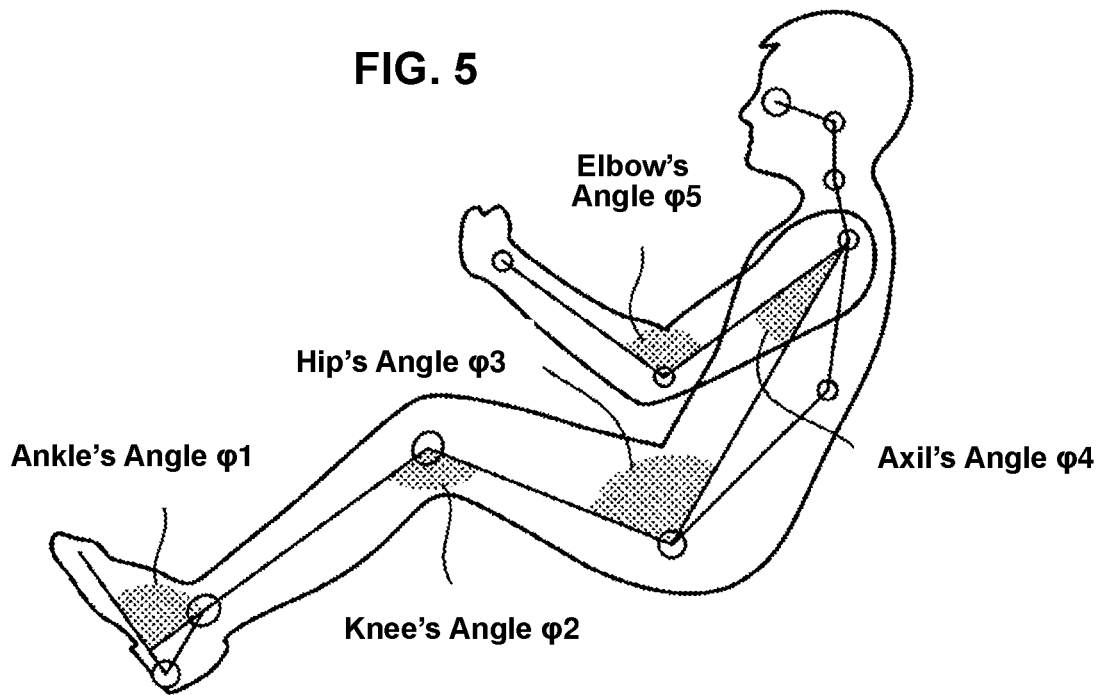
FIG. 5 is a diagram explaining an appropriate driving position.
Figure 6A:
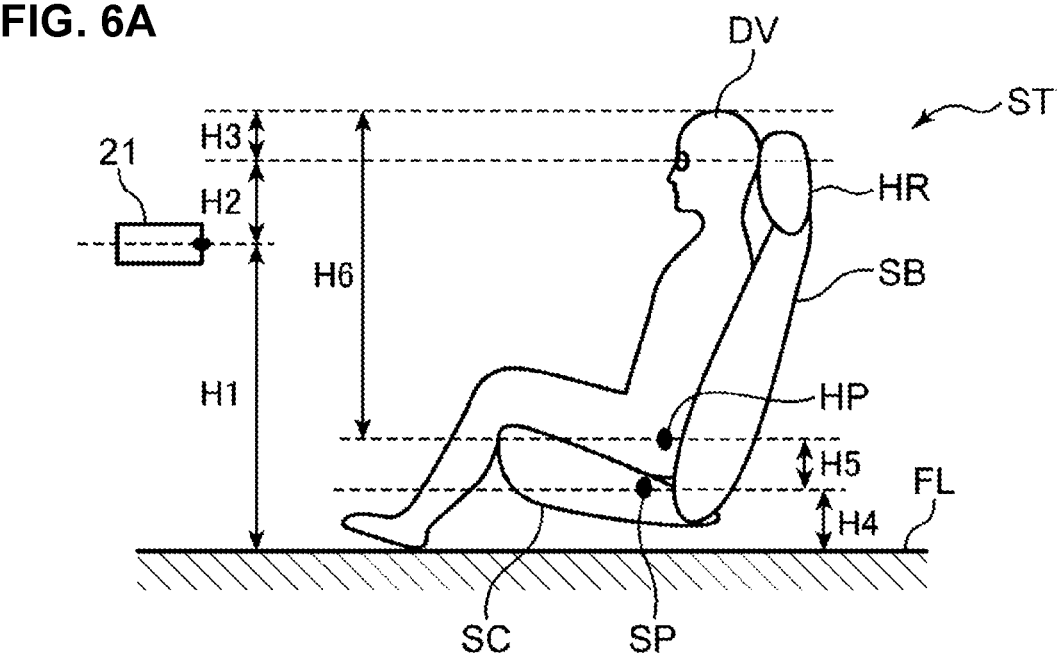
FIGS. 6A and 6B are diagrams explaining a calculation method of upper-body's length and definitions of standing height, upper-body's length, and leg's length.
Figure 6B:
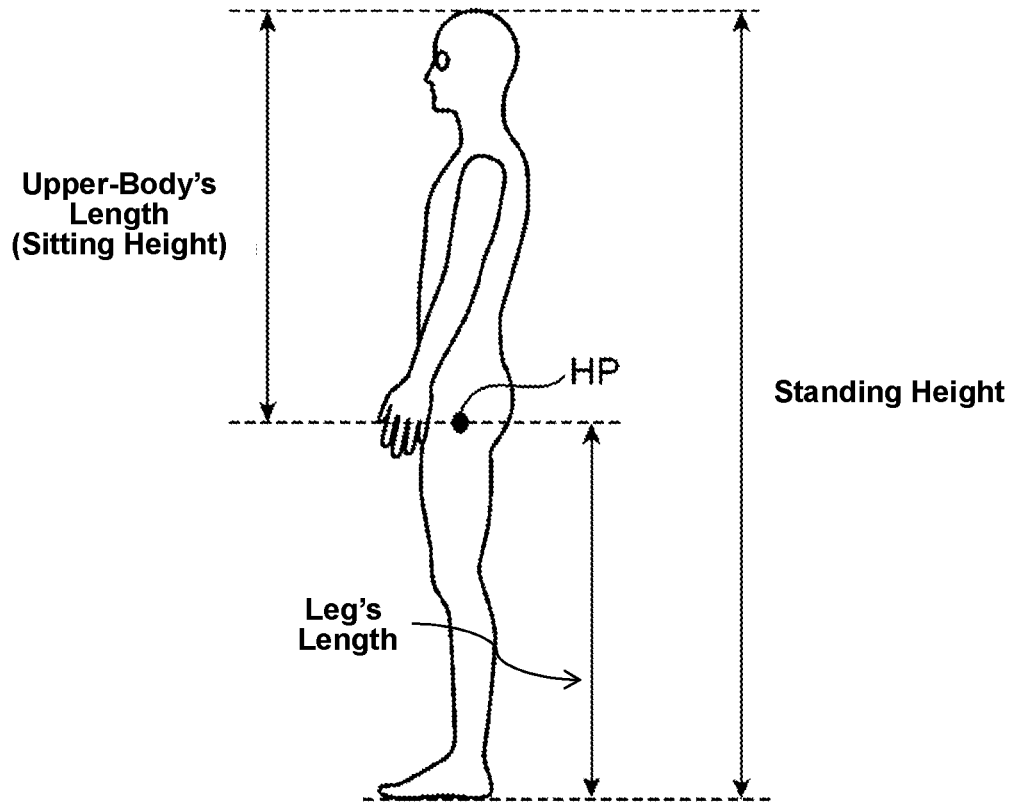

FIGS. 2A and 2B are diagrams explaining a second input section of the driving-position setting device, wherein FIG. 2A is a perspective view and FIG. 2B is a side view. FIGS. 3A and 3B are diagrams explaining a first input section and an eye-height measuring section of the driving-position setting device, wherein FIG. 3A is a perspective view around a driver's seat (an example of the vehicle seat) and FIG. 3B is a side view. FIG. 4 is a graph explaining class feature-quantity information as an example. FIG. 5 is a diagram explaining an appropriate driving position. FIGS. 6A and 6B are diagrams explaining a calculation method of upper-body's length and definitions of standing height, upper-body's length, and leg's length, wherein FIG. 6A is the one explaining the calculation method of the upper-body's length and FIG. 6B is the one explaining the definitions of the standing height, the upper-body's length, and the leg's length.

In the following description, terms of representing directions of "front," "rear," "right," "left," "upper," "lower" and others mean the respective directions of the vehicle in a case where a proceeding forward direction of the vehicle is defined as "front."

A driving-position setting device D of the embodiment comprises an input section 1, an eye-height measuring section 2, a control processing section 3, a memory section 4, a seat driving section 5, a steering device 6, and an indication device (display) 7 as shown in FIG. 1, for example.

The seat driving section 5, which is coupled to the control processing section 3, moves a position of a vehicle seat ST according to controlling of the control processing section 3. A passenger DV is seated in the vehicle seat ST, which comprises a seat cushion SC which forms a sitting surface, a seatback SB which is attached to a rear end (the other end) of the seat cushion SC at its lower end (one end) and forms a backrest, and a pillow-shaped headrest HR which is attached to an upper end (the other end) of the seatback SB, as shown in FIG. 2, for example. The seat driving section 5 is incorporated into the vehicle seat ST. The seat driving section 5 of the present embodiment comprises, for example, an electromotive reclining mechanism 51 to adjust an inclination of the seatback SB, an electromotive slide mechanism 52 to adjust a position (longitudinal position) of the seat cushion SC in a longitudinal direction, an electromotive lift mechanism 53 to adjust a position (vertical position, height) of the seat cushion SC in a vertical direction, and an electromotive tilt mechanism 54 to adjust an inclination of the sitting surface of the seat cushion SC by adjusting the height of a front end (one end) of the seat cushion SC in the vertical direction. These mechanism 51, 52, 53, 54 are constituted by usual practices, which are disclosed in Japanese Patent Laid-Open Publication Nos. 2011-79472, 2019-172016, 2006-218882 and the like, for example. The inclination of the seatback SB is represented by an angle (reclining angle) between a normal line of a horizontal plane (e.g., a floor surface FL of the vehicle) and a straight line along an extension direction extending in a height direction of the seatback SB. Accordingly, the seatback SB takes its position rising more upright in a case the reclining angle is smaller, and the seatback SB takes its position inclined rearward, lying down, in a case the reclining angle is larger. The inclination of the sitting surface is represented by an angle between the horizontal plane and the sitting surface.

The input section 1, which is coupled to the control processing section 3, inputs various kinds of instructions (commands), such as instructions to move the position of the vehicle seat ST (instructions to adjust the position of the vehicle seat ST), and various kinds of data necessary in operating the driving-position setting device D (body-size specification device), such as the standing height of the passenger DV, to the driving-position setting device D. The input section 1 of the present embodiment comprises a first input section 11, a second input section 12, and a third input section 13 as shown in FIGS. 1 through 3.

Figure 8A:
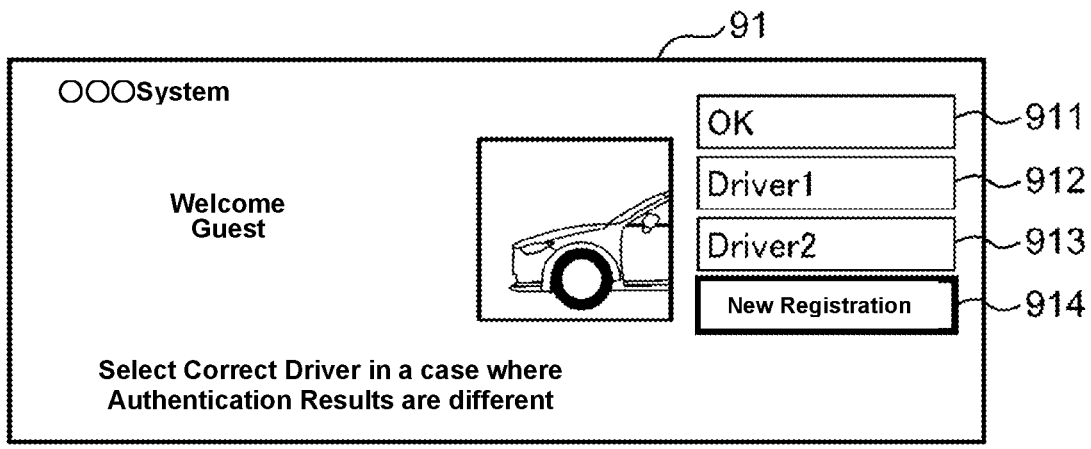
FIGS. 8A, 8B and 8C are exemplified screens indicated at an indication device (a first example).
Figure 8B:
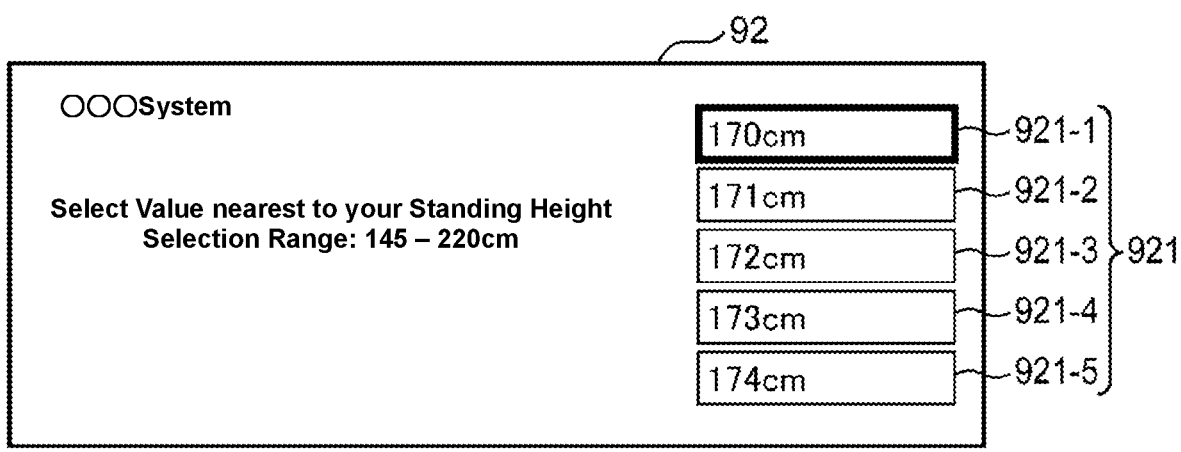

The first input section 11 receives inputs of various kinds of data, such as the standing height. The first input section 11 may be constituted with plural switches, such as a tenkey, but in the present embodiment, it is constituted by a columnar dial switch which can be rotated around an axis and pushed in an axial direction, which is arranged at a center console to separate a driver's seat and an assistant driver's seat in a vehicle cabin as shown in FIG. 3A, for example. This dial switch is configured, as shown in FIG. 8B described later, such that a value indicated at the indication device 7 (e.g., a head-up display (HUD) or a center display) increases or decreases according to a rotational direction when the dial switch is rotated (e.g., increases when the dial switch is rotated clockwise, decreases when the dial switch is rotated counterclockwise), and the value indicated at the indication device 7 is confirmed and inputted to the driving-position setting device D (body-size specification device) by pushing the dial switch.

The second input section 12 inputs instructions of moving the position of the vehicle seat ST. The second input section 12 of the present embodiment comprises a switch for seatback (SB switch) 121 to input instructions of adjusting the inclination of the seatback SB and a switch for seat cushion (SC switch) 122 to input respective instructions of adjusting the longitudinal direction and the vertical position of the seat cushion SC and the inclination of the sitting surface of the seat cushion SC as shown in FIG. 2, for example. The second input section 12 is arranged at a lower side face of the vehicle seat ST such that the SB switch 121 and the SC switch 122 form a side-view shape of the vehicle seat ST. The SB switch 121 is configured such that it is inclined substantially in the longitudinal direction around a rotational axis provided at its lower end portion. The SC switch 122 is configured such that its front end and its rear end are respectively inclined substantially in the vertical direction around a rotational axis provided at its central portion, and also it is moved in the longitudinal direction.

In a manual adjustment of the position of the vehicle seat ST, as shown in FIG. 2A, when the SB switch 121 is inclined forward (or rearward), the control processing section 3 controls the reclining mechanism 51 such that the seatback SB is inclined forward (or rearward) while the SB switch 121 is inclined, so that the reclining angle of becomes small (or becomes large) gradually. Further, when the SB switch 121 is recovered (returned to its neutral position), the control processing section 3 stops the reclining mechanism 51, so that the seatback SB keeps its position with this reclining angle. As shown in FIG. 2A, when the SC switch 122 is moved forward (or rearward), the control processing section 3 controls the reclining mechanism 52 such that the seat cushion SC moves forward (or rearward) gradually while the SC switch 122 is moved forward (or removed). When the SC switch 122 is recovered, the control processing section 3 stops the reclining mechanism 52, so that the seat cushion SC keeps its position with this longitudinal position. When the SC switch 122 is inclined with its rear end moved upward (or its rear end moved downward) as shown in FIG. 2A, the control processing section 3 controls the lift mechanism 53 such that the seat cushion SC moves upward (or downward) gradually while the SC switch 122 is inclined with its rear end moved upward (or its rear end moved downward). When the SC switch 122 is recovered, the control processing section 3 stops the reclining mechanism 53, so that the seat cushion SC keeps its position with this vertical position (height). When the SC switch 122 is inclined with its front end moved upward (or its rear end moved downward) as shown in FIG. 2A, the control processing section 3 controls the tilt mechanism 54 such that a front end of the seat cushion SC moves upward (or downward) gradually while the SC switch 122 is inclined with its front end moved upward (or its front end moved downward). When the SC switch 122 is recovered, the control processing section 3 stops the tilt mechanism 54, so that the seat cushion SC keeps its position with this inclination of the sitting surface.

The third input section 13 inputs instructions of moving the position of the steering wheel. The third input section 13 comprises a switch for tilt move to input instructions of adjusting a vertical position of the steering wheel and a switch for telescopic move to input instructions of adjusting a longitudinal position of the steering wheel, which are arranged around the steering device 6.

The eye-height measuring section 2 measures the eye's height (eye's position in a height direction) of the passenger DV seated into the vehicle seat ST. The eye-height measuring section 2 of the present embodiment comprises an eye-height data acquiring section 21 and an eye-height processing section 36 (22), for example. The eye-height data acquiring section 21, which is coupled to the control processing section 3, acquires prescribed data for measuring the eye's height of the passenger DV seated into the vehicle seat ST according to the controlling of the control processing section 3. The eye-height processing section 36 (22) is functionally constituted by the control processing section 3 which executes a control processing program described later in the present embodiment, wherein the eye's height of the passenger DV is determined by processing the above-described prescribed data acquired by the eye-height data acquiring section 21.

For example, the eye-height data acquiring section 21 comprises a camera to capture an image of the passenger DV seated into the vehicle seat ST, and is arranged at a prescribed place, e.g., as shown in FIG. 3A, at a one-side end portion (an upper-end portion, or the like) of the indication device 7 which is disposed at a side part of a dashboard where a vehicle speed, an engine rotational speed, and the like are indicated. Since individual variation in width of the person's face is statistically small, the face's width of the person is considered as a statistically-predetermined fixed value (face-width fixed value). Accordingly, the eye-height processing section 36 (22) determines the eye's height based on the image of the passenger DV captured by the camera and the above-described face-width fixed value. More specifically, first, the eye-height processing section 36 (22) extracts an outline (contour) of the face by using the edge filter, the circular Hough transformation or the like or by using the face's pattern matching, for example, from a prescribed image area in the image of the passenger DV captured by the camera where the image of the face of the passenger DV is presumably positioned, and determines the pixel number which exists in a single line along a width direction which has the maximum width of the face's outline. The above-described prescribed image area is predetermined by an arrangement position of the camera, an arrangement of the vehicle seat ST, a focus distance or a direction of an optical axis of the camera, or the like, and memorized by the memory section 4, for example. Next, the eye-height processing section 36 (22) divides the above-described face-width fixed value by the above-described pixel number and determines the actual length of an object which is imaged on a single pixel considering the camera parameters, such as the focus distance of the camera. Subsequently, the eye-height processing section 36 (22) determines a pixel position of a white portion of the eye by extracting the white portion of the eye from the above-described prescribed image area (or the image area in the outline of the face) through an image processing using a white-filter, for example, determines the pixel number from a lowermost end of the image of the passenger DV (or the pixel position where the optical axis of the camera passes (normally, a position of a central pixel of the image)) to the above-determined pixel position of the white portion of the eye, and determines the eye's height by multiplying this determined pixel number by the above-determined actual length of the object imaged on the single pixel. Herein, in a case where the optical axis of the camera does not extend in the horizontal direction but has a specified angle relative to the horizontal direction, this specified angle is considered in calculation of the eye's height. Further, in a case where the pixel is not squire but rectangular, the actual length of the object imaged on the single pixel of the width direction (lateral direction) is converted into the actual length of the object imaged on the single pixel of the longitudinal direction from its longitudinal/lateral ratio, which is used in calculating the above-described eye's height.

The eye's height is measured from a prescribed standard position. This standard position of the eye's height may be a position of a floor surface of the vehicle, a position of the sitting surface of the seat cushion SC, a position of a hip point HP according to the position of the vehicle seat ST, or the like. In the present embodiment, however, it is set at an arrangement position of the eye-height data acquiring section 21 in the height direction as shown in FIGS. 3B and 6A.

The actual length of the object imaged on the single pixel is determined by using the camera parameter in the above-described example. Herein, since the camera parameter is a previously-known parameter, a function formula (or a table) to convert the actual length of the object imaged on the single pixel from the pixel number existing in the above-described single line may be previously made and the actual length of the object imaged on the single pixel may be determined by the above-described function formula from the pixel number existing in the single line.

Alternatively, the eye-height data acquiring section 21 comprises the camera to capture the image of the passenger DV seated into the vehicle seat ST and a distance meter (e.g., an infrared pulse distance meter) to measure the distance to the passenger DV seated in the vehicle seat ST, which are arranged in the same manner described above, for example. The eye-height processing section 36 (22) determines the eye's height of the passenger DV based on the image of the passenger DV captured by the above-described camera and the distance to the passenger DV measured by the above-described distance meter. In this case, the eye-height processing section 36 (22) determines the actual length of the object imaged on the single pixel from the above-measured distance to the passenger DV and camera parameters of the camera, and determines the eye's height of the passenger DV in the same manner described above. Herein, so-called stereo cameras may be used instead of the distance meter. In this case, one of the stereo cameras can be used as the above-described camera of the eye-height data acquiring section 21.

The steering device 6 steers the steering wheel, changing the position of the steering wheel. The steering wheel 6 comprises the steering wheel, a steering shaft which is coupled to the steering wheel, a steering-angle sensor to detect a steering angle which is generated at the steering shaft according to an operation of the steering wheel, and a steering-angle driving mechanism to apply the steering angle to the steering wheel according to the steering angle detected by the steering-angle sensor, for example. The steering shaft comprises a tilt mechanism which is coupled to the control processing section 3 and electrically moves vertically the steering wheel according to the control of the control processing section 3 and a telescopic mechanism which is coupled to the control processing section 3 and electrically moves longitudinally the steering wheel according to the control of the control processing section 3. These tilt and telescopic mechanisms are constituted by usual practices, which are disclosed in Japanese Patent Laid-Open Publication Nos. 2020-19327, 2019-23050 and the like, for example.

In a manual adjustment of the position of the steering wheel, when it is instructed by the TR switch that the vertical position of the steering wheel is raised (or lowered), the control processing section 3 gradually raises (lowers) the vertical position of the steering wheel by means of the tilt mechanism of the steering device 6. When the TR switch is recovered, the control processing section 3 stops the tilt mechanism of the steering device 6, so that the steering wheel keeps its position at this vertical position. When it is instructed by the TS switch that the longitudinal position of the steering wheel is moved forward (or rearward), the control processing section 3 gradually moves the longitudinal position of the steering wheel forward (or rearward) by means of the telescopic mechanism of the steering device 6. When the TS switch is recovered, the control processing section 3 stops the telescopic mechanism of the steering device 6, so that the steering wheel keeps its position at this longitudinal position.

The indication device (display) 7 is coupled to the control processing section 3 and indicates prescribed information, such as the standing height which is inputted by the first input section 11, for example, according to the control of the control processing section 3, which is constituted by a center display, a head-up display, or the like of a liquid crystal display (LCD), for example.

The memory section 4 is coupled to the control processing section 3, which is a circuit to memorize various kinds of programs and various kinds of data according to the control of the control processing section 3. The above-described programs include a control processing program. This control processing program includes a control program to control respective sections 1, 2, and 4-7 of the driving-position setting device D (body-size class specification device) according to their functions, an upper-body-length ratio processing program to determine the upper body's length of the passenger DV based on the standing height of the passenger DV received by the first input section 11 and the eye's height of the passenger DV measured by the eye-height measuring section 2, to determine an upper-body-length ratio of the upper-body's length to leg's length which is determined based on the above-determined upper-body's length and the standing height of the passenger DV received by the first input section 11, and to set the standing height of the passenger DV received by the first input section 11 and the above-determined upper-body-length ratio as the feature quantities for characterizing a class to classify a body size, a class specifying program to specify the class corresponding to the feature quantities of the passenger DV processed by the above-described upper-body-length processing program based on class feature-quantity information which is memorized by a class feature-quantity information memorizing section 41 described later, a dimension-ratio specifying program to specify dimension-ratio information corresponding to the class specified by the above-described class specifying program based on class dimension-ratio information which is memorized by a class dimension-ratio information memorizing section 42 described later, a position control program to control the seat driving section 5 such that the position of the vehicle seat ST becomes the one corresponding to the driving position based on the standing height of the passenger DV received by the first input section 11 and the dimension-ratio information specified by the dimension-ratio specifying program. The above-described various kinds of data include data necessary to execute respective programs relating to the class feature-quantity information, the class dimension-ratio information, and the like. The memory section 4 comprises ROM (Read Only Memory) which is a non-volatile storage element, EEPROM (Electrically Erasable Programmable Read Only Memory) which is a re-writable non-volatile storage element, and so on. The memory section 4 further comprises RAM (Random Access Memory) which is a working memory of the control processing section 3 to memorize the data and the like generated in executing the above-described programs. Further, the memory section 4 functionally comprises the class feature-quantity information memorizing section 41 and the class dimension-ratio information memorizing section 42.

The class feature-quantity information memorizing section 41 memorizes the class feature-quantity information. The class feature-quantity information is the information to correlate plural classes for classifying the body size (body-size classes, groups, body-size groups) according to the dimension ratio of prescribed parts (first parts, parts for body-size classification) of a body with plural prescribed feature quantities for characterizing the plural classes. The parts for body-size classification are the ones to be set properly from aspects of body-size classification, e.g., an arm portion, a trunk portion, a leg portion, of the like. Since the dimension ratio of the respective parts of the body can be determined statistically for each body side, the above-described plural classes may be the classes which are classified from aspects of the races or the classes which are classified from aspects of the races and the sexuality, for example. Alternatively, the above-described plural classes may be the classes which are classified from aspects of the regions or the classes which are classified from aspects of the regions and the sexuality, for example. Alternatively, the above-described plural classes may be the classes which are classified from aspects of the nations (countries) or the classes which are classified from aspects of the nations (countries) and the sexuality, for example. The feature quantities of the present embodiment is the standing height and the upper-body-length ratio which have been found out from results of the above-described researches conducted in the try-and-error manner. The upper-body-length ratio is the ratio of the upper-body's length to the leg's length (upper-body's length/leg's length). When the upper-body-length ratio is greater than 1 (upper-body's length/leg's length>1), the upper-body's length is longer than the leg's length (upper-body's length>leg's length). When the upper-body-length ratio is smaller than 1 (upper-body's length/leg's length<1), the leg's length is longer than the upper-body's length (upper-body's length<leg's length). As shown in FIG. 6B, the standing height means the length from the sole to the top of head of the person in the standing state, the leg's length means the length from the sole to the hip point HP of the person in the standing state, and the upper-body's length (sitting height) means the length from the hip point HP to the top of head of the person in the standing state.

In the present embodiment, as shown in FIG. 4, the body size is classified into six classes of the first-sixth classes, the feature quantity is the standing height and the upper-body-length ratio as described above, and the upper-body-length ratio is a function of the standing height from the above-described researches' results. A lateral axis of FIG. 4 is the standing height, and its vertical axis is the upper-body-length ratio. A first class ASM relates to a male of the Asian (e.g., Japanese male), which shows a straight line (first functional straight line) extending obliquely rightward-and-downward such that the upper-body-length ratio becomes smaller as the standing height becomes higher. A second class ASF relates to a female of the Asian (e.g., Japanese female), which shows a straight line (second functional straight line) extending obliquely rightward-and-downward such that the upper-body-length ratio becomes slightly smaller as the standing height becomes higher. A third class EPM relates to a male of the Europe (e.g., German male), which shows a straight line (third functional straight line) extending obliquely rightward-and-upward such that the upper-body-length ratio becomes slightly greater as the standing height becomes higher. A fourth class EPF relates to a female of the Europe (e.g., German female), which shows a straight line (fourth functional straight line) extending obliquely rightward-and-downward such that the upper-body-length ratio becomes smaller as the standing height becomes higher. A fifth class NAM relates to a male of the North America (e.g., American male), which shows a straight line (fifth functional straight line) extending obliquely rightward-and-upward such that the upper-body-length ratio becomes slightly greater as the standing height becomes higher. A sixth class NAF relates to a female of the North America (e.g., American female), which shows a straight line (sixth functional straight line) extending obliquely rightward-and-upward such that the upper-body-length ratio becomes greater as the standing height becomes higher. Among the straight lines extending obliquely rightward-and-downward, the inclination of the straight line of the first class ASM is the greatest, the inclination of the straight line of the second class ASF is the smallest, and the inclination of the straight line of the fourth class EPF is between those of the first and second classes ASM, ASF. Among the straight lines extending obliquely rightward-and-upward, the inclination of the straight line of the sixth class NAF is the greatest, the inclination of the straight line of the fifth class NAM is the smallest, and the inclination of the straight line of the third class EPM is between those of the fifth and sixth classes NAM, NAF. Respective ranges of the standing height of the classes differ from each other depending on distribution of the standing height.

The respective feature quantities (first through sixth feature quantities) of these first through sixth classes are represented by respective formulas of the functional straight line of the upper-body-length ratio to the standing height. The first class ASM is correlated with the first functional formula of the first feature quantity, the second class ASF is correlated with the second functional formula of the second feature quantity, the third class EPM is correlated with the third functional formula of the third feature quantity, the fourth class EPF is correlated with the fourth functional formula of the fourth feature quantity, the fifth class NAM is correlated with the fifth functional formula of the fifth feature quantity, the sixth class NAF is correlated with the sixth functional formula of the sixth feature quantity, and these are memorized by the class feature-quantity information memorizing section 41 as the class feature-quantity information. Herein, while the functional formula is used in the above-described case, a table of the standing height and the upper-body-length ratio may be used (first through sixth tables corresponding to the first through sixth functional straight lines).

The class dimension-ratio information memorizing section 42 memorizes the class dimension-ratio information. The class dimension-ratio information is the information to correlate the above-described plural classes with the plural dimension-ratio information representing the dimension ratio of the prescribed second parts of the body which relate to the driving position. The appropriate driving position is the position, as shown in FIG. 5 for example, in which stepping of a brake pedal and an acceleration pedal is easy to change in a state where a heel is placed on a floor, the vehicle speed, the engine rotational speed, and the like indicated on the dashboard can be recognized with a wrist put on a steering wheel and without any interference of the steering wheel, and the front view of the passenger can be secured. This appropriate driving position is regulated by an ankle's angle $\varphi 1$, a knee's angle $\varphi 2$, a hip's angle $\varphi 3$, an axil's angle $\varphi 4$, and an elbow's angle $\varphi 5$, and these angles $\varphi 1$, $\varphi 2$, $\varphi 3$, $\varphi 4$, $\varphi 5$ are respectively set in prescribed ranges from plural samples so as to provide the above-described position. A calculation method of this appropriate driving position is known, and the above-described driving-position relating to parts of the body are an arm portion (an upper arm portion and a forearm portion), a hand portion, a trunk portion, a leg portion (a thigh portion and a shin portion), a foot portion, a buttocks portion, and the like, for example. The dimension ratios of these second parts of the body to the upper-body's length, for example, are previously determined statistically. The human-body dimension data which has been opened to the public may be used, for example. Herein, what are not correlated with the upper-body's length, such as the thickness of the buttocks portion or the length of the arm portion, are included in the dimension-ratio information as a fixed value. In the present embodiment, the first through sixth dimension-ratio information are previously prepared according to the first through sixth classes, and the class dimension-ratio information to correlate the first through sixth classes with the first through sixth dimension-ratio information is memorized by the class dimension-ratio information memorizing section 42.

The control processing section 3 is a circuit which controls the respective sections 1, 2 and 4-7 of the driving-position setting device D (body-size class specification device) according to their functions, specifies the class of the passenger DV seated in the vehicle seat ST, and controls the position of the vehicle seat ST such that the appropriate driving position according to the passenger DV with the specified class can be attained. The control processing section 3 is constituted by comprising CPU (Central Processing Unit) and its peripheral circuit, for example. The control processing section 3 functionally comprises a control section 31, an upper-body-ratio processing section 32, a class specifying section 33, a dimension-ratio specifying section 34, a position control section 35, and the eye-height processing section 36 (22).

The control processing section 3 conducts a whole control of the driving-position setting device D (body-size class specification device) by controlling the respective sections 1, 2 and 4-7 of the driving-position setting device D according to their functions.

The eye-height processing section 36 (22) determines the eye's height of the passenger DV by processing the above-described prescribed data required by the eye-height data acquiring section 21 as described.

The upper-body-length ratio processing section 32 determines the upper-body's length of the passenger DV based on the standing height of the passenger DV received by the first input section 11 and the eye's height of the passenger DV measured by the eye-height measuring section 2 (the eye's height of the passenger DV determined by the eye-height processing section 36 (22)), determines the upper-body-length ratio of this determined upper-body's length to the leg's length of the passenger DV which is determined based on the upper-body's length and the standing height received by the first input section 11, and sets the standing height of the passenger DV received by the first input section 11 and the above-determined upper-body-length ratio as the feature quantity. In the present embodiment, since the height and the inclination of the sitting surface of the seat cushion SC are changeable, the upper-body-length ratio processing section 32 determines the upper-body's length of the passenger DV based on the standing height of the passenger DV received by the first input section 11, the eye's height of the passenger DV measured by the eye-height measuring section 2, and the height and the inclination of the sitting surface of the vehicle seat ST where the passenger DV is seated.

More specifically, as shown in FIGS. 6A and 6B, for example, upper-body's length H6 is determined by subtracting the sum of a fourth distance (height of the sitting surface) H4 which is from the floor surface FL to the sitting surface of the vehicle seat ST and a fifth distance (fifth height) H5 which is from the sitting surface of the vehicle seat ST to the hip point HP from the sum of a first distance (first height) H1 which is from the floor surface FL where the vehicle seat ST is attached to the arrangement position of the eye-height data acquiring section (the camera in the above-described example) 21, a second distance (eye's height of the passenger DV) H2 which is from the arrangement position of the arrangement position of the eye-height data acquiring section (the camera in the above-described example) 21 to the eye's position of the passenger DV, and a third distance (third height) H3 which is from the eye's position of the passenger DV to the position of the top of head of the passenger DV (H6=(H1+H2+H3)−(H4+H5)). The first distance H1 is provided as a designing value. The eye's height H2 of the passenger DV is provided by the measuring of the eye-height measuring section 2. The third distance H3 is provided from the human-body dimension data which has been predetermined statistically, for example. The fourth distance H4 is provided from designing values (the height of the sitting surface when a lift amount is zero, the inclination of the sitting surface when a tilt amount is zero) and state values of the lift mechanism 53 (the current lift amount) and the tilt mechanism 54 (the current tilt amount). The current lift amount and the current tilt amount are acquired by the upper-body-length ratio processing section 32 from the lift mechanism 53 and the tilt mechanism 54, for example. Alternatively, the current lift amount and the current tilt amount are acquired from respective control values (control commands) of the position control section 35 which are acquired by the upper-body-length ratio processing section 32. The fifth distance H5 is determined from the thickness of the buttocks portion which is statistically acquired from the human-body dimension data, for example. The designing values for acquiring the first distance H1, the third distance H3, and the fourth distance H4 and the fifth distance H5 are previously memorized by the memory section 4 as one of the above-described various kinds of data. In the calculation of the upper-body's length, the third distance H3 and the fifth distance H5 are fixed values, not depending on the class (e.g., an average value of the classes). The leg's length is determined by subtracting the upper-body's length from the standing height of the passenger DV received by the first input section 11 (the leg's length=the standing height–the upper-body's length).

The class specifying section 33 specifies the class (the standing height and the upper-body-length ratio in the present embodiment) corresponding to the feature quantity of the passenger DV processed by the upper-body-length ratio processing section 32 based on the class feature-quantity information memorized by the class feature-quantity information memorizing section 41. More specifically, the class specifying section 33 selects the standing height and the upper-body-length ratio nearest to the standing height of the passenger DV received by the first input section 11 and the upper-body-length ratio determined by the upper-body-length ratio processing section 32 from the plural standing heights and the plural upper-body-length ratios which are correlated with the plural classes in a two-dimensional coordinates space with two axes of the standing height and the upper-body-length ratio, and specifies the class corresponding to the selected standing height and upper-body-length ratio as the one corresponding to the upper-body-length ratio (the feature quantity of the passenger DV) which is acquired based on the standing height received by the first input section 11 and the eye's height measured by the eye-height measuring section 2. The above-described nearest standing height and upper-body-length ratio are, for example, the standing height received by the first input section 11 and the upper-body-length ratio which is the nearest to the upper-body-length ratio determined by the upper-body-length ratio processing section 32. For example, as shown in FIG. 4, in a case where the standing height of the passenger DV received by the first input section 11 is TL and the upper-body-length ratio determined by the upper-body-length ratio processing section 32 is RT, the class specifying section 33 selects, as the above-described nearest standing height and upper-body-length ratio, the standing height TL of the passenger DV received by the first input section 11 and the upper-body-length ratio RC which is the nearest to the upper-body-length ratio RT determined by the upper-body-length ratio processing section 32, and specifies the third class EPM having these standing height TL and upper-body-length ratio RC. Herein, while the class specifying section 3 selects the nearest upper-body-length ratio from the upper-body-length ratios of the plural classes, while fixing the standing height, in the above-described example, the class having the functional straight line which is the nearest in a distance to the standing height of the passenger DV received by the first input section 11 and the upper-body-length ratio determined by the upper-body-length ratio processing section 32 may be specified. That is, the above-described nearest standing height and upper-body-length ratio may be the standing height and the upper-body-length ratio which are the nearest in a distance to the standing height of the passenger DV received by the first input section 11 and the upper-body-length ratio determined by the upper-body-length ratio processing section 32 among the plural standing heights and the plural upper-body-length ratios which are respectively correlated to the plural classes.

The dimension-ratio specifying section 34 specifies the dimension-ratio information corresponding to the class specified by the class specifying section 33 based on the class dimension-ratio information memorized by the class dimension-ratio information memorizing section 42. In the above-described example shown in FIG. 4, the third dimension-ratio information corresponding to the third class EPM specified by the class specifying section 33 is specified.

The position control section 33 controls the seat driving section 5 such that the position of the vehicle seat ST becomes the one corresponding to the driving position based on the standing height of the passenger DV received by the first input section 11 and the dimension-ratio information specified by the dimension-ratio specifying section 34. While the appropriate driving position is attained by controlling the position of the vehicle seat ST similarly to the above-described patent document, the position control section 35 of the present embodiment is also configured to control the steering device 6, in order to attain the appropriate driving position, such that the position of the steering wheel becomes the one corresponding to the driving position based on the standing height of the passenger DV received by the first input section 11 and the dimension-ratio information specified by the dimension-ratio specifying section 34. That is, the position control section 35 controls the seat driving section 5 and the steering device 6 such that the position of the vehicle seat ST and the position of the steering wheel become the ones corresponding to the driving position based on the standing height of the passenger DV received by the first input section 11 and the dimension-ratio information specified by the dimension-ratio specifying section 34. More specifically, first, the position control section 35 determines the dimensions of the prescribed second parts relating to the driving position of the body from the standing height received by the first input section 11 and the dimension-ratio information specified by the dimension-ratio specifying section 34. For example, in a case where the dimension of the thigh portion is determined, the dimension of the thigh portion is determined by multiplying the dimension ratio of the thigh portion of the dimension-ratio information specified by the dimension-ratio specifying section 34 by the upper-body's length determined by the upper-body-length ratio processing section 32 based on the standing height of the passenger DV received by the first input section 11. In this case, in a case where the standing height of the passenger DV received by the first input section 11 and the upper-body-length ratio determined by the upper-body-length ratio processing section 32 as the feature quantity select the nearest feature quantity and thereby specify the class as shown in the above-described example shown in FIG. 4, the dimensions of the prescribed second parts relating to the driving position may be corrected based on a difference. More specifically, the position control section 35 determines respective lengths of the above-described second parts based on the standing height of the passenger DV received by the first input section 11 and the dimension-ratio information specified by the dimension-ratio specifying section 34 and corrects the above-determined respective lengths of the second parts based on a difference between a first point (a point MP in the example shown in FIG. 4) which is represented by the standing height of the passenger DV received by the first input section 11 and the upper-body-length ratio determined by the upper-body-length ratio processing section 32 and a second point (a point CP in the example shown in FIG. 4) which is represented by the nearest standing height and upper-body-length ratio in the two-dimensional coordinates space with the two axes of the standing height and the upper-body-length ratio. For example, in a case where the upper-body-length ratio determined by the upper-body-length ratio processing section 32 is greater than that which is one of the feature quantities of the above-described class when the above-described difference is x [%] to the feature quantity of the above-described class, the above-determined respective lengths of the second parts are corrected so as to be longer by the x [%] respectively. Meanwhile, in a case where the upper-body-length ratio determined by the upper-body-length ratio processing section 32 is smaller than that which is one of the feature quantities of the above-described class, the above-determined respective lengths of the second parts are corrected so as to be shorter by the x [%] respectively. Herein, since the second parts not correlated with the upper-body's length is the fixed value as described above, the position control section 35 corrects only the second part (e.g., a vertical length of the face) correlated to the upper-body's length except the leg's length (the second parts not correlated with the upper-body's length, such as the thickness of the buttocks portion and the length of the arm portion, are not corrected and their fixed values are used simply). Then, the position control section 35 determines the position of the vehicle seat ST and the position of the steering wheel corresponding to the driving position based on these corrected lengths of the driving-position relating parts by the commonly-used means and controls the seat driving section 5 and the steering device 6 such that the position of the vehicle seat ST and the position of the steering wheel become the above-determined positions. For example, Japanese Patent Laid-Open Publication Nos. 2017-33320, 2016-165961, and 2019-38320 can be referred to for the respective positions of the vehicle seat and the steering wheel corresponding to the driving position.

Herein, the first input section 11, the eye-height measuring section 2, and the upper-body-length ratio processing section 32 are an example of the feature-quantity acquiring section to acquire the feature quantity of the object for specifying the class. The passenger DV is an example of the object for the body-size class specification device. The vehicle seat ST is an example of the seat for the body-size class specification device. The class feature-quantity information memorizing section 41, the first input section 11, the eye-height measuring section 2 and the upper-body-length ratio processing section 32 (an example of the feature-quantity acquiring section), and the class specifying section 33 are an example of the body-size class specifying device.

Figure 7:
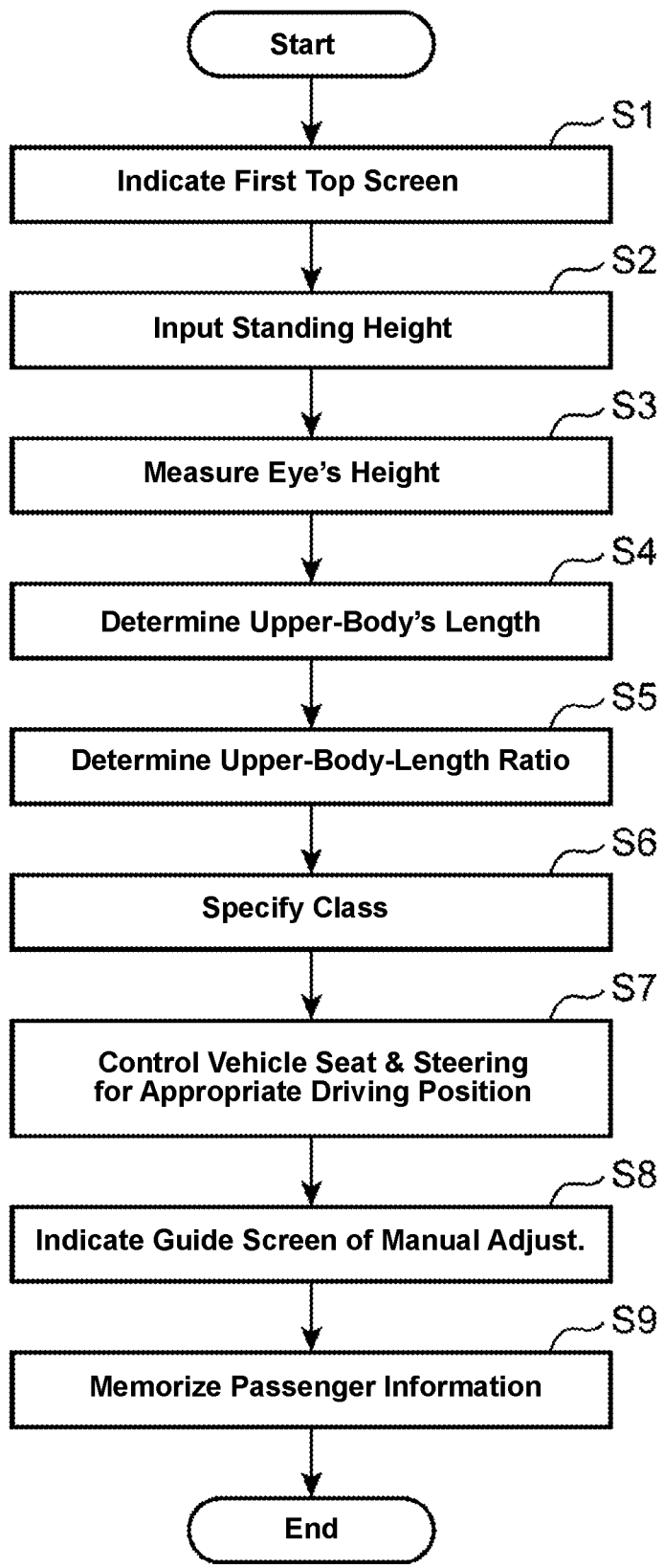
FIG. 7 is a flowchart showing an operation of the driving-position setting device.
Figure 8C:
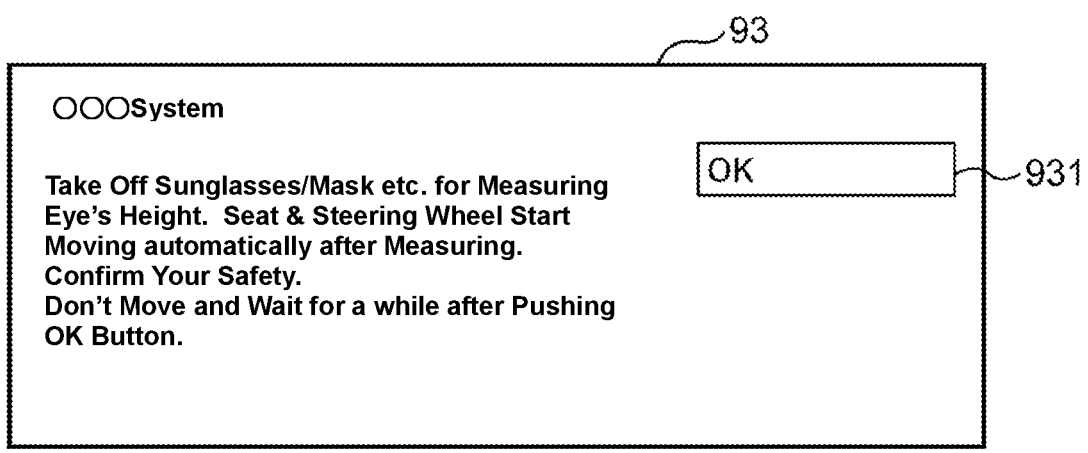
Figure 9A:
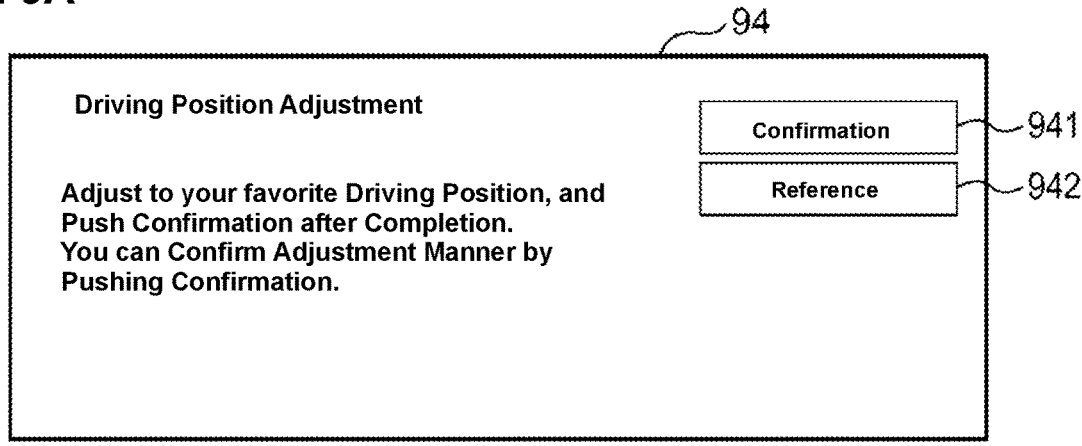
FIGS. 9A, 9B and 9C are exemplified screens indicated at the indication device (a second example).
Figure 9B:
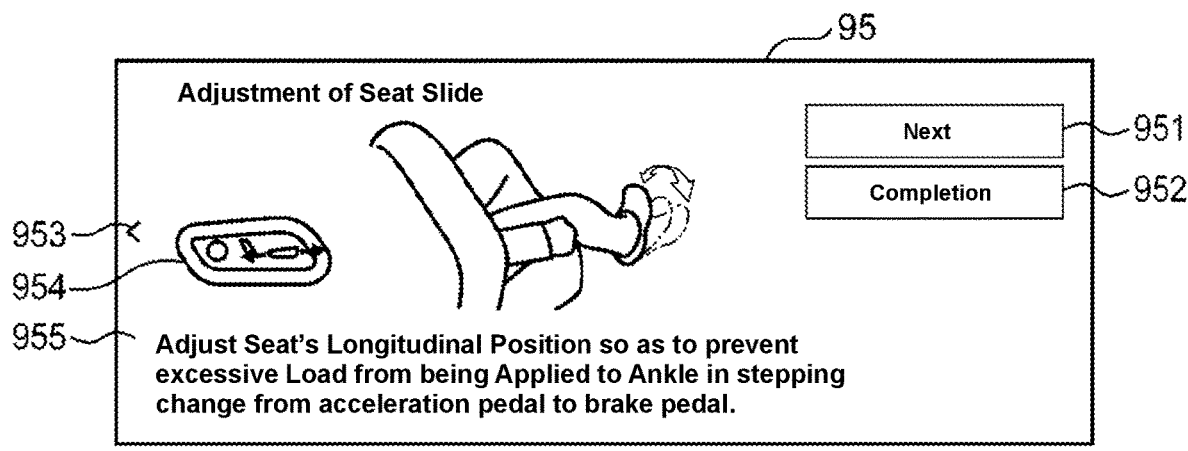
Figure 9C:
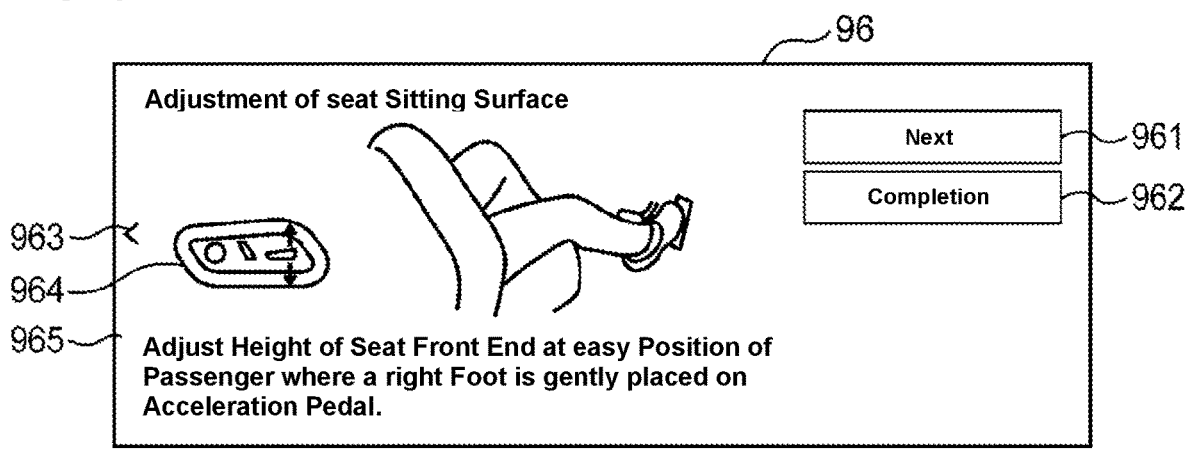
Figure 10A:
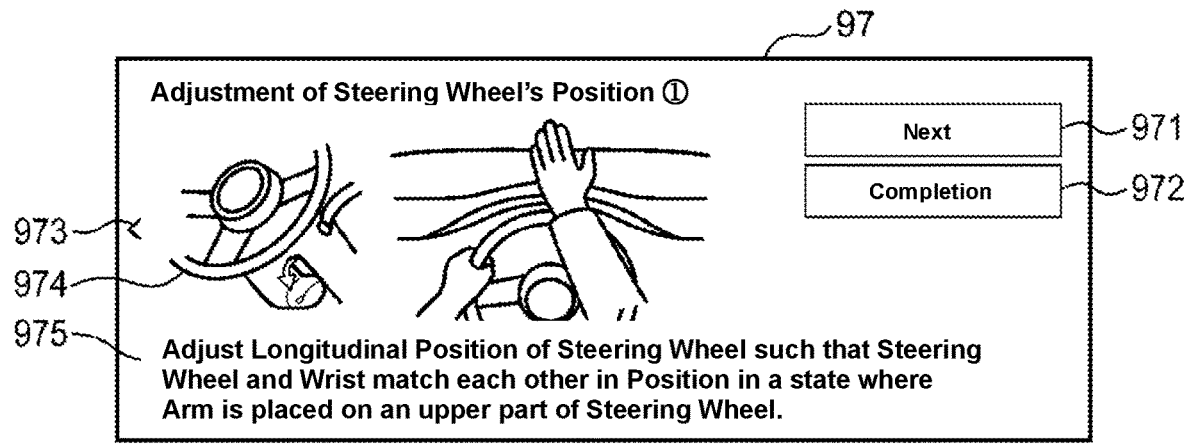
FIGS. 10A, 10B and 10C are exemplified screens indicated at the indication device (a third example).
Figure 10B:
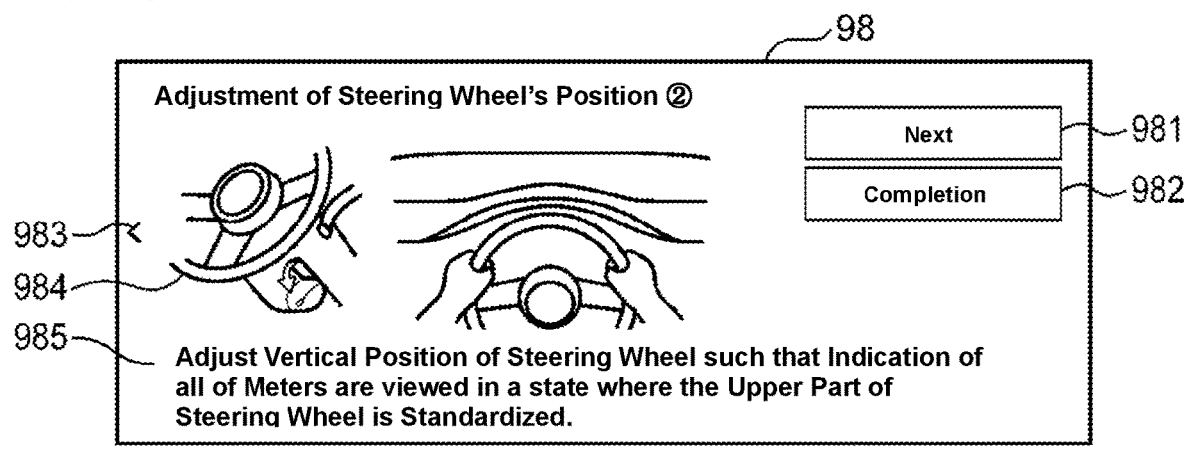
Figure 10C:
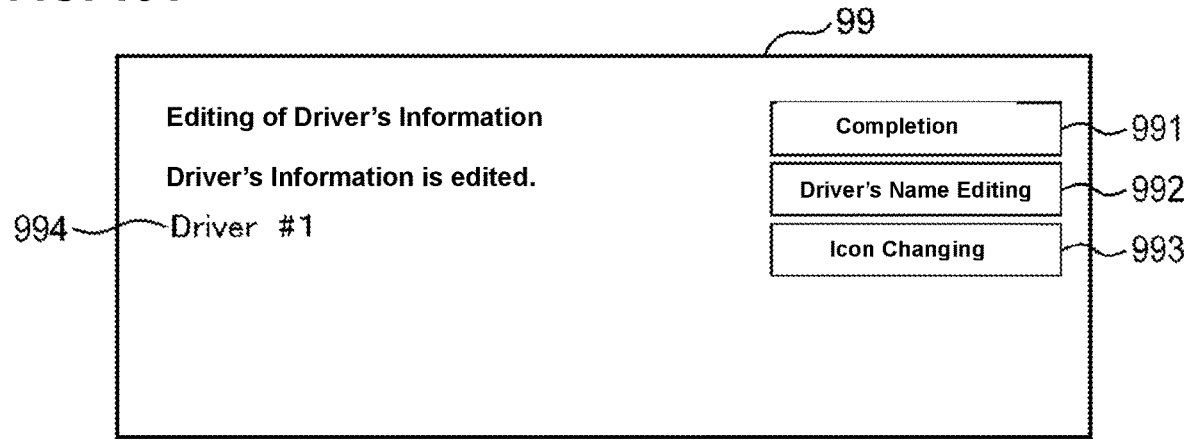

Next, operations of the present embodiment will be described. FIG. 7 is a flowchart showing an operation of the above-described driving-position setting device. FIGS. 8A, B, C through 10A, B, C are diagrams showing exemplified screens indicated in an indication device. FIG. 8A shows a top screen (a first top screen) for passenger registration, FIG. 8B shows a standing-height input screen for input of the standing height by means of the first input section 11, and FIG. 8C shows an eye-height-measuring precautions screen for display of precautions in measuring of the eye's height. FIG. 9A shows a top screen (a second top screen) in a case of manually adjusting the position of the vehicle seat and the position of the steering wheel, FIG. 9B shows a seat-slide guide screen for guiding an adjusting method of the longitudinal position of the vehicle seat, and FIG. 9C shows a seat sitting-surface guide screen for guiding an adjusting method of the sitting surface of the vehicle seat. FIG. 10A shows a telescopic guide screen for guiding an adjusting method of the longitudinal position of the steering wheel, FIG. 10B shows a tilt guide screen for guiding an adjusting method of the vertical position of the vehicle wheel, and FIG. 10C shows a passenger-information editing screen for editing the passenger information.

When the vehicle starts its operation, the driving-position setting device D (the body-size class specification device) executes initialization of the necessary respective parts and starts its operation. The control section 31, the upper-body-length ratio processing section 32, the class specifying section 33, the dimension-ratio specifying section 34, the position control section 35 and the eye-height processing section 36 (22) are functionally constituted by the control processing section 3 through execution of the control processing program of the driving-position setting device D. Then, the following operations relating to the setting of the driving position are started according to the operation start of the vehicle, operations of some switches (not illustrated) to input instructions of the setting start of the driving position, and the like, for example.

In FIG. 7, first, the driving-position setting device D indicates the top screen (the first top screen) for the passenger registration at the indication device 7 by means of the control section 31 of the control processing section 3 (S1).

For example, the driving-position setting device D further comprises registration function and authentication function (detection function) of the passenger DV, and this first top screen 91 is, as shown in FIG. 8A, for example, provided with an "OK" button 911 to input whether or not the passenger DV is the one who is authenticated by the driving-position setting device D, passenger-name indication areas 912, 913 to indicate the passenger's names registered at the driving-position setting device D and the passenger who is authenticated by the driving-position setting device D (authentication results, and a "new registration" button 914 to input instructions of executing the new registration of the passenger DV. For example, the passenger-registration information to correlate the passenger's names with the authentication results is memorized by the memory section 4, the passenger's names registered (memorized) at the passenger-registration information are indicated at the passenger-name indication areas 912, 913 when the above-described processing S1 is executed, face authentication is executed by the commonly-used means based on the image of the passenger DV which is captured by the above-described camera of the eye-height data acquiring section 21, and in a case where the authentication results exist in the passage-registration information, a frame of the passenger-name indication area 912 (or the passenger-name indication area 913) where the passenger's name correlated with the above-described authentication results is indicated is highlighted. For example, the frame is highlighted by changing a thin frame line to a thick frame line, for example. When a dial switch of the first input section 11 is rotationally operated, the frame's highlighting indication is moved in a cyclic manner in order: the "OK" button 911, the passenger-name indication area 912, the passenger-name indication area 913, the "new registration" button 914, the "OK" button 911 . . . , and when the dial switch is pushing-operated, contents of the highlighted frame are inputted to the driving-position setting device D. In the example shown in FIG. 8A, the frame of the button 914 is highlighted, wherein the dial switch is pushing-operated in this indication state. The data of the above-described first top screen 91 is memorized as one data of the above-described various kinds of prescribed data together with screen data described later by the memory section 4.

When the dial switch is pushing-operated, a driving-position-adjustment precautions screen (not illustrated) to indicate precautions at the time the driving position is adjusted, such as precautions of "keep vehicle's stopping until completed" for example, is indicated, and the driving-position setting device D indicates the standing-height input screen for inputting the standing height by the first input section 11 at the indication device 7 by means of the control section 31 after a predetermined period of time has passed or through inputting of transition instructions (for example, an input operation of the "OK" button indicated at the driving-position-adjustment precautions screen), whereby inputting of the standing height of the passenger DV is received (S2).

This standing-height input screen 92 includes an input-choice-values indication area 921 for indicating and inputting values of input choice as shown in FIG. 8B, for example. While the input-choice-values indication area 921 may be configured to indicate a single value, five areas, i.e., first through fifth sub input-choice-value indication areas 921-1-921-5, are provided in the example shown in FIG. 8B. When the dial switch of the first input section 11 is rotationally operated, the frame's highlighting indication is moved in order according to its rotational direction, for example, in a case where the dial switch is rotationally operated in a counterclockwise direction, the frame's highlighting indication is moved in order from the fifth sub input-choice-value indication area 921-5 to the first sub input-choice-value indication area 921-1. Then, once its moving reaches the first sub input-choice-value indication area 921-1, the value itself indicated at the input-choice-value indication area 921 sequentially increases. Meanwhile, in a case where the dial switch is rotationally operated in a clockwise direction, the frame's highlighting indication is moved in order from the first sub input-choice-value indication area 921-1 to the fifth sub input-choice-value indication area 921-5. Then, once its moving reaches the fifth sub input-choice-value indication area 921-5, the value itself indicated at the input-choice-value indication area 921 sequentially decreases. In the example shown in FIG. 8B, values of "170 cm" through "174 cm" are respectively indicated at the first through fifth sub input-choice-value indication areas 921-1 through 921-5, and the frame of the first sub input-choice-value indication area 921-1 indicating the "170 cm" is highlighted. Herein, the dial switch is pushing-operated in this indication state. Thus, the value of "170 cm" is inputted to the driving-position setting device D as the standing height of the passenger DV.

Once the inputting of the standing height of the passenger DV is received, the driving-position setting device D indicates an eye-height measuring precautions screen 93 shown in FIG. 8C, for example, for indicating precautions in a case of measuring the eye's height at the indication device 7 by means of the control section 31, and the eye's height of the passenger DV is measured by the eye-height measuring section 2 (S3).

Once the eye's height of the passenger DV is measured, the driving-position setting device D, by means of the upper-body-length ratio processing section 32 of the control processing section 3, determines the upper-body's length of the passenger DV based on the standing height of the passenger DV received by the first input section 11 in the processing S2 and the eye's height of the passenger DV measured by the eye-height measuring section 2 in the processing S3, determines the leg's length of the passenger DV based on the upper-body's length determined in the processing S4 and the standing height received by the first input section 11 and thereby determines the upper-body-length ratio (S5), wherein the standing height of the passenger DV received by the first input section 11 in the processing S2 and this determined upper-body-length ratio are set as the feature quantity for characterizing the class.

Once the upper-body-length ratio is determined, the driving-position setting device D, by means of the class specifying section 33 of the control processing section 3, specifies the class (S6) corresponding to the feature quantity of the passenger DV processed by the upper-body-length ratio processing section 32 in the processing S5 (the standing height and the upper-body-length ratio in the present embodiment) based on the class feature-quantity information memorized by the class feature-quantity information memorizing section 41. As described above, in the case shown in FIG. 4, for example, in the case where the standing height of the passenger DV received by the first input section 11 in the processing S2 is TL and the upper-body-length ratio determined by the upper-body-length ratio processing section 32 in the processing S5 is RT, the class specifying section 3 selects the standing height TL and the upper-body-length ratio RC nearest to the upper-body-length ratio RT of the passenger DV from the respective upper-body-length ratios of the plural classes corresponding to this standing height TL, wherein the third class EPM having these standing height TL and upper-body-length ratio RC is specified.

Once the class of the passenger is specified, the driving-position setting device D, by means of the dimension-ratio specifying section 34 of the control processing section 3, specifies the dimension-ratio information corresponding to the class specified by the class specifying section 33 in the processing S6 based on the class dimension-ratio information memorized by the class dimension-ratio information memorizing section 42, and controls the seat driving section 5 and the steering device 6 (S7), by means of the position control section 35 of the control processing section 3, such that the position of the vehicle seat ST and the position of the steering wheel become the ones corresponding to the driving position based on the standing height of the passenger DV received by the first input section 11 in the processing S2 and the dimension-ratio information specified by the dimension-ratio specifying section 34.

The class of the passenger DV is automatically specified from the plural body-size classes and the position of the vehicle seat ST and the position of the steering wheel are controlled so that the driving position suitable for the body size of the passenger DV can be attained as described above, and the present embodiment is configured such that the position of the vehicle seat ST and the position of the steering wheel are manually adjustable as well.

That is, subsequently to the above-described processing S7, the driving-position setting device D, by means of the control section 31 of the control processing section 3, indicates the top screen (the second top screen) for manual adjusting of the position of the vehicle seat ST and the position of the steering wheel at the indication device 7 (S8).

This second top screen 94 is, as shown in FIG. 9A, for example, provided with a "confirmation" button 941 to input instructions of determining (confirming) the respective current positions of the vehicle seat ST and the steering wheel, a "reference" button 942 to input instructions of indicating respective guide screens to guide an adjusting method of the driving position, and an explanations indication area 943 to indicate explanations for expanding the second top screen 94. For example, explanations of "Press confirmation after completing an adjustment of the driving position. Adjustment manner can be confirmed by pressing reference" are indicated at the explanations indication area 943.

At the second top screen 94, the "confirmation" button 941 is selected by rotationally operating the dial switch of the first input section 11 (the frame of the "confirmation" button 941 is highlighted), and once this dial switch is pushing-operated, the current positions of the vehicle seat ST and the steering wheel are respectively confirmed, and then processing S9 is executed.

Meanwhile, at the second top screen 94, the "reference" button 942 is selected by rotationally operating the above-described dial switch (the frame of the "reference" button 942 is highlighted), and once this dial switch is pushing-operated, a seat-slide guide screen for guiding an adjusting method of the longitudinal position of the vehicle seat ST is indicated at the indication device 7.

This seat-slide guide screen 95 is provided, as shown in FIG. 9B, for example, with a "next" button 951 to input instructions of indicating the next guide screen, a "completion" button 952 to input instructions of confirming the current positions of the vehicle seat ST and the steering wheel and completing the manual adjustment, a "<" button 953 to input instructions of returning to the one-previous screen, a first illustration indication area 954 to indicate illustration (an image diagram) (first illustration) for guiding the adjustment method of the longitudinal position of the vehicle seat ST, and a first guide indication area 955 to indicate a guide (first guide) for guiding the adjustment method of the longitudinal position of the vehicle seat ST. Guide of "Adjust seat's longitudinal position so as to prevent an excessive load from being applied to an ankle in stepping change from an acceleration pedal to a brake pedal", for example, is indicated at the first guide indication area 955.

At the seat-slide guide screen 95, the "completion" button 952 is selected by rotationally operating the dial switch of the first input section 11, and once this dial switch is pushing-operated, the current positions of the vehicle seat ST and the steering wheel are respectively confirmed, and then the processing S9 is executed.

Meanwhile, at the seat-slide guide screen 95, the "next" button 951 is selected by rotationally operating the above-described dial switch, and once this dial switch is pushing-operated, a seat sitting-surface guide screen for guiding an adjusting method of the seat sitting surface of the vehicle seat ST is indicated at the indication device 7.

This seat sitting-surface guide screen 96 is provided, as shown in FIG. 9C, for example, with a "next" button 961, a "completion" button 962 and a "<" button 963, similarly to the above-described "next" button 951, "completion" button 952, and "<" button 953, a second illustration indication area 964 to indicate illustration (second illustration) for guiding the adjustment method of the seat sitting surface of the vehicle seat ST, and a second guide indication area 965 to indicate a guide (second guide) for guiding the adjustment method of the seat sitting surface of the vehicle seat ST. Guide of "Adjust the height of a seat front end at an easy position of the passenger where a right foot is gently placed on the acceleration pedal without pressing it", for example, is indicated at the second guide indication area 965.

At the seat sitting-surface guide screen 96, the "completion" button 962 is selected by rotationally operating the dial switch of the first input section 11, and once this dial switch is pushing-operated, the current positions of the vehicle seat ST and the steering wheel are respectively confirmed, and then the processing S9 is executed.

Meanwhile, at the seat sitting-surface guide screen 96, the "next" button 961 is selected by rotationally operating the above-described dial switch, and once this dial switch is pushing-operated, a telescopic guide screen for guiding an adjusting method of the longitudinal position of the steering wheel is indicated at the indication device 7.

This telescopic guide screen 97 is provided, as shown in FIG. 10A, for example, with a "next" button 971, a "completion" button 972 and a "<" button 973, similarly to the above-described "next" button 951, "completion" button 952, and "<" button 953, a third illustration indication area 974 to indicate illustration (third illustration) for guiding the adjustment method of the longitudinal position of the steering wheel, and a third guide indication area 975 to indicate a guide (third guide) for guiding the adjustment method of the longitudinal position of the steering wheel. Guide of "Adjust the longitudinal position of the steering wheel such that the steering wheel and a wrist match each other in position in a state where an arm is placed on an upper part of the steering wheel", for example, is indicated at the third guide indication area 975.

At the telescopic guide screen 97, the "completion" button 972 is selected by rotationally operating the dial switch of the first input section 11, and once this dial switch is pushing-operated, the current positions of the vehicle seat ST and the steering wheel are respectively confirmed, and then the processing S9 is executed.

Meanwhile, at the telescopic guide screen 97, the "next" button 971 is selected by rotationally operating the above-described dial switch, and once this dial switch is pushing-operated, a tilt guide screen for guiding an adjusting method of the vertical position of the steering wheel is indicated at the indication device 7.

This tilt guide screen 98 is provided, as shown in FIG. 10B, for example, with a "next" button 981, a "completion" button 982 and a "<" button 983, similarly to the above-described "next" button 951, "completion" button 952, and "<" button 953, a fourth illustration indication area 984 to indicate illustration (fourth illustration) for guiding the adjustment method of the vertical position of the steering wheel, and a fourth guide indication area 985 to indicate a guide (fourth guide) for guiding the adjustment method of the vertical position of the steering wheel. Guide of "Adjust the vertical position of the steering wheel such that indications of all of meters are viewed in a state where the upper part of the steering wheel is standardized", for example, is indicated at the fourth guide indication area 985. Herein, at the tilt guide screen 98, once the "next" button 981 is inputting-operated by the dial switch of the first input section 11, a guide screen, not illustrated, for guiding adjustment of a door mirror, a guide screen, not illustrated, for guiding adjustment of the head-up display, and the like are indicated, and no "next" button is indicated at final guide screens of these respective guide screens.

Returning to FIG. 7, in the above-described processing S9, the driving-position setting device D registers (memorizes) the current positions of the vehicle seat ST and the steering wheel by means of the control section 31 of the control processing section 3, indicates the passenger-information editing screen for editing the passenger information at the indication device 7, and once an input operation by means of the dial switch of the first input section 11 for a "completion" button 991 described later is received, the current positions of the vehicle seat ST and the steering wheel which are correlated with the passenger's name are further registered and memorized to the above-described passenger registration information. Then, the present processing ends.

This passenger-information editing screen 99 is provided, as shown in FIG. 10C, for example, with the "completion" button 991 to update the passenger registration information, memorize it at the memory section 4, and input instructions of ending the present processing, a "driver's name editing" button 992 to input the passenger's name and instructions of editing, an "icon changing" button 993 to input instructions of changing an icon, and a passenger's name input editing column 994 to input the passenger's name and make editing. Once the "completion" button 991 is selected by rotationally rotating the dial switch of the first input section 11 and the dial switch is pushing-operated, the above-confirmed current positions of the vehicle seat ST (the reclining angle of the vehicle seat ST, the longitudinal position of the seat cushion SC, the vertical position of the seat cushion SC, and the inclination of the sitting surface of the seat cushion SC) and the steering wheel (the vertical and longitudinal positions of the steering wheel) are further registered and memorized by the passenger registration information, being correlated with the passenger's name indicated at the passenger's name input editing column 994.

As described above, the body-size class specification device provided with the driving-position setting device D of the present embodiment and the body-size class specification method executed by the body-size class specification device can automatically specify the class of the passenger DV from the plural classes based on the feature quantity of the object person to be specified for the class by using the class feature-quantity information which is memorized by correlating the plural classes for classifying the body size with the plural prescribed feature quantities for characterizing the plural classes.

Since the above-described feature quantity is, as described above, the standing height and the upper-body-length ratio in the present body-size class specification device and the present body-size class specification method, the class of the passenger DV can be properly specified based on the feature quantity of the passenger DV.

The present body-size specification device and the present body-size class specification method can automatically determine the upper-body-length ratio included in the feature quantity based on the input of the standing height of the passenger DV and the measurement of the eye's height of the passenger DV.

According to the present embodiment, the driving-position setting device and the driving-position setting method which are provided with the body-size class specification device and the body-size class specification method and can control the position of the vehicle seat so as to attain the driving position suitable for the body size of the passenger in the destination can be provided. Since the diving position setting device and the driving-position setting method are provided with the body-size class specification device and the body-size class specification method, the class of the passenger DV can be specified without any input of the class of the passenger DV, so that it is unnecessary to manufacture the vehicle differently according to the destination. This can properly reduce manufacturing steps and costs. Thus, since the class of the passenger DV is specified, the driving-position setting device and the driving-position setting method can automatically attain the appropriate driving position according to the class of the passenger DV.

The present driving-position setting device and the present driving-position setting method correct the respective lengths of the second parts, so that the more appropriate driving position according to the passenger DV seated in the vehicle seat ST can be attained.

The present driving-position setting device and the present driving-position setting method control not only the position of the vehicle seat ST but the position of the steering wheel, so that the more appropriate driving position can be attained.

Herein, while the above-described embodiment is configured such that the reclining mechanism 51, the slide mechanism 52, the lift mechanism 53 and the tilt mechanism 54 of the seat driving section 5 are respectively controlled for the control of the position of the vehicle seat ST, at least one of the reclining mechanism 51, the slide mechanism 52, the lift mechanism 53 and the tilt mechanism 54 may be controlled. Likewise, while the telescopic mechanism and the tilt mechanism of the steering device 6 are respectively controlled for the control of the position of the steering wheel, at least one of the telescopic mechanism and the tilt mechanism may be controlled. Herein, in a case where the inclination of the sitting surface of the seat cushion SC is fixed without the tilt mechanism 54, the designing value of the inclination of the sitting surface is used for the calculation of the upper-body's length. In a case where the height of the sitting surface of the seat cushion SC is fixed without the lift mechanism 53, the designing value of the height of the sitting surface is used for the calculation of the upper-body's length.

The present invention should not be limited to the above-described embodiment, and any other modifications or improvements may be applied within the scope of a spirit of the present invention.

What is claimed is:

1. A body-size class specification device, comprising:
    a memory to memorize class feature-quantity information to correlate plural classes for classifying a body size of a person according to a dimension ratio of prescribed parts of a body of the person with plural prescribed feature quantities for characterizing the plural classes, wherein the body size of the person is classified from one or more of aspects of sexualities, races, regions, or nations;
    a circuit to:
    acquire feature quantity of the person to be specified for a class, wherein the feature quantity of the person incudes standing height of the person and an upper-body-length ratio of upper body's length of the person to leg's length of the person; and
    specify the class corresponding to the feature quantity of the person acquired by said circuit based on the class feature-quantity information memorized by said memory; and
    one or more electromotive mechanism coupled to the circuit to move a position of a vehicle seat based on the acquired feature quantity and specified class corresponding to the acquired feature quantity of the person.

2. The body-size class specification device of claim 1, wherein said circuit is configured to:
    receive an input of the standing height of the person,
    measure an eye's height of the person in a seated position,
    determine the upper-body's length of the person based on the standing height received and the eye's height measured,
    determine the leg's length of the person based on said determined upper-body's length and the standing height received, determine the upper-body-length ratio of said determined upper-body's length to said determined leg's length, and decide said feature quantity of the person by using said standing height inputted and said determined upper-body-length ratio.

3. A body-size class specification method, in which class feature-quantity information to correlate plural classes for classifying a body size of a person according to a dimension ratio of prescribed parts of a body of the person with plural prescribed feature quantities for characterizing the plural classes is memorized by a memory and a class of an object person is specified from the plural classes, the body-size class specification method comprising:

a feature-quantity acquiring step of acquiring the feature quantity of the person;

a class specifying step of specifying the class corresponding to the feature quantity of the person acquired by said feature-quantity acquiring step based on the class feature-quantity information memorized by said memory; and a vehicle seat moving step of moving a position of a vehicle seat based on the acquired feature quantity and specified class corresponding to the acquired feature quantity of the person, wherein the body size of the person is classified from one or more of aspects of sexualities, races, regions, or nations, wherein the feature quantity of the person incudes standing height of the person and an upper-body-length ratio of upper body's length of the person to leg's length of the person.

* * * * *